US011514561B2

(12) United States Patent
Yamada et al.

(10) Patent No.: US 11,514,561 B2
(45) Date of Patent: Nov. 29, 2022

(54) STORAGE MEDIUM, LENS APPARATUS, IMAGE PICKUP APPARATUS, PROCESSING APPARATUS, CAMERA APPARATUS, METHOD OF MANUFACTURING LENS APPARATUS, AND METHOD OF MANUFACTURING PROCESSING APPARATUS

(71) Applicant: CANON KABUSHIKI KAISHA, Tokyo (JP)

(72) Inventors: Tomoya Yamada, Utsunomiya (JP); Kazufumi Goto, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/708,234

(22) Filed: Dec. 9, 2019

(65) Prior Publication Data
US 2020/0193576 A1 Jun. 18, 2020

(30) Foreign Application Priority Data
Dec. 14, 2018 (JP) .............................. JP2018-234728

(51) Int. Cl.
*G06T 5/00* (2006.01)
*G02B 15/14* (2006.01)
*G02B 15/15* (2006.01)
*H04N 5/232* (2006.01)
(Continued)

(52) U.S. Cl.
CPC .......... *G06T 5/009* (2013.01); *G02B 15/1421* (2019.08); *G02B 15/15* (2013.01); *H04N 5/23229* (2013.01)

(58) Field of Classification Search
CPC .... G06T 5/009; G02B 15/1421; G02B 15/15; G02B 7/102; G02B 13/16; H04N 5/23229;
(Continued)

(56) References Cited

U.S. PATENT DOCUMENTS

2004/0257454 A1 12/2004 Pinto et al.
2011/0074984 A1 3/2011 Terasawa
(Continued)

FOREIGN PATENT DOCUMENTS

CN 1366423 A 8/2002
JP H11-164194 A 6/1999
(Continued)

*Primary Examiner* — Christopher K Peterson
(74) *Attorney, Agent, or Firm* — Canon U.S.A., Inc. IP Division

(57) ABSTRACT

A storage medium stores correction data for obtaining a correction amount for correcting image data, obtained from an image formed by a lens apparatus, with respect to a distribution of a light amount in the image, wherein the correction data includes a coefficient of an n-th order polynomial (where n is a non-negative integer) with respect to an image height h, the coefficient corresponding to a state of the lens apparatus. The coefficient satisfies a first inequality $-0.15 \leq dD'(h) - d D\mathrm{lens}(h) \leq 1.98$, where dDlens(h) represents a change amount of the light amount at the image height h per an increase amount dh of the image height h, and dD'(h) represents a change amount of an inverse of a value of the n-th order polynomial at the image height h per the increase amount dh.

22 Claims, 13 Drawing Sheets

(51) Int. Cl.
  *G02B 7/10*    (2021.01)
  *G03D 3/00*    (2006.01)
  *H04N 5/357*   (2011.01)
  *G02B 13/16*   (2006.01)
  *H04N 5/225*   (2006.01)
  *H04N 5/217*   (2011.01)

(58) Field of Classification Search
  CPC .... H04N 5/3572; H04N 5/2253; H04N 5/217; H04N 5/2254; H04N 5/23212; G03D 3/00
  See application file for complete search history.

(56) References Cited

U.S. PATENT DOCUMENTS

| | | | |
|---|---|---|---|
| 2011/0128406 A1 | 6/2011 | Shirai | |
| 2012/0268613 A1 | 10/2012 | Nishio | |
| 2015/0181128 A1* | 6/2015 | Kaku | G03B 13/34 |
| | | | 348/143 |
| 2016/0182843 A1* | 6/2016 | Endo | H04N 5/3572 |
| | | | 348/294 |
| 2016/0316155 A1 | 10/2016 | Richards | |
| 2020/0195852 A1* | 6/2020 | Goto | G02B 13/16 |

FOREIGN PATENT DOCUMENTS

| | | |
|---|---|---|
| JP | 2008-96907 A | 4/2008 |
| JP | 2014-023070 A | 2/2014 |
| JP | 2017-215409 A | 12/2017 |
| WO | 2018/179318 A1 | 10/2018 |

\* cited by examiner

STORAGE MEDIUM, LENS APPARATUS, IMAGE PICKUP APPARATUS, PROCESSING APPARATUS, CAMERA APPARATUS, METHOD OF MANUFACTURING LENS APPARATUS, AND METHOD OF MANUFACTURING PROCESSING APPARATUS

BACKGROUND OF THE INVENTION

Field of the Invention

The aspect of the embodiments relates to a storage medium, a lens apparatus, an image pickup apparatus, a processing apparatus, a camera apparatus, a method of manufacturing a lens apparatus, and a method of manufacturing a processing apparatus.

Description of the Related Art

In most of cameras for broadcasting (television cameras), cameras for movies, cameras for photographs, video cameras, and similar cameras, the light amount is smaller in a peripheral portion of an image plane than in a central portion of the image plane. The ratio of the light amount in the peripheral portion to the light amount in the central portion (relative illumination) changes as an optical system is operated by, for example, zooming, focusing, or the operation of an aperture stop.

A change of the ratio is caused by one or both of a change of the light amount in the central portion and a change of the light amount in the peripheral portion. A main cause is that, as the optical system is operated in the manner described above, a part of an axial light beam and an off-axis light beam cannot transmit a lens, the aperture stop, another optical member, or a structure member, for example. This is improved by increasing the effective diameter of the lens or a similar member so as to cover all paths of the axial light beam and the off-axis light beam that change as the optical system is operated. The increased effective diameter, however, is adverse to downsizing and downweighting of a lens apparatus. In addition, the increased effective diameter increases spherical aberration, curvature of field, and other types of aberration, and correction thereof is difficult. A method has therefore been known in which a drop in light amount is corrected by image processing instead of being optically corrected. Correction of image data obtained by picking up an image by a camera apparatus with respect to a light amount distribution in an image formed by the lens apparatus is hereinafter referred to as "light amount (distribution) correction" or "light amount (distribution) compensation".

In Japanese Patent Application Laid-Open No. 2008-96907, there is disclosed a lens apparatus having information (correction data) on correction of decrease in lateral chromatic aberration and peripheral light amount, which is configured to transmit the information to a camera apparatus based on a command from the camera apparatus. In Japanese Patent Application Laid-Open No. H11-164194, there is disclosed a method involving using a quadratic, cubic, or quartic expression for an image height as a correction expression in order to speed up processing of correcting a limb darkening characteristic.

When the correction amount at each image height is expressed by an n-th order polynomial being a relatively low-order expression, although there is a benefit in that an amount of data can be reduced, there may be a disadvantage in terms of an error exhibited when a correction amount for a case in which a change in light amount depending on an image height is steep is approximated. For example, in a case where the correction amount is approximated by a quartic polynomial, when the correction amount undulates as the image height changes, image data after correction exhibits annular unevenness, which may give a sense of strangeness.

SUMMARY OF THE INVENTION

According to at least one embodiment of the present invention, there is provided a storage medium which stores correction data for obtaining a correction amount for correcting image data, obtained from an image formed by a lens apparatus, with respect to a distribution of a light amount in the image, wherein the correction data includes a coefficient of an n-th order polynomial (where n is a non-negative integer) for an image height h, the coefficient corresponding to a state of the lens apparatus, the coefficient satisfies a first conditional expression:

$$-0.15 \leq dD'(h) - dD\text{lens}(h) \leq 1.98,$$

where $d D\text{lens}(h)$ represents a change amount of the light amount at the image height h per an increase amount dh of the image height h, and $dD'(h)$ represents a change amount of an inverse of a value of the n-th order polynomial at the image height h per the increase amount dh.

Further features of the disclosure will become apparent from the following description of exemplary embodiments with reference to the attached drawings.

DESCRIPTION OF THE EMBODIMENTS

Figure 1:
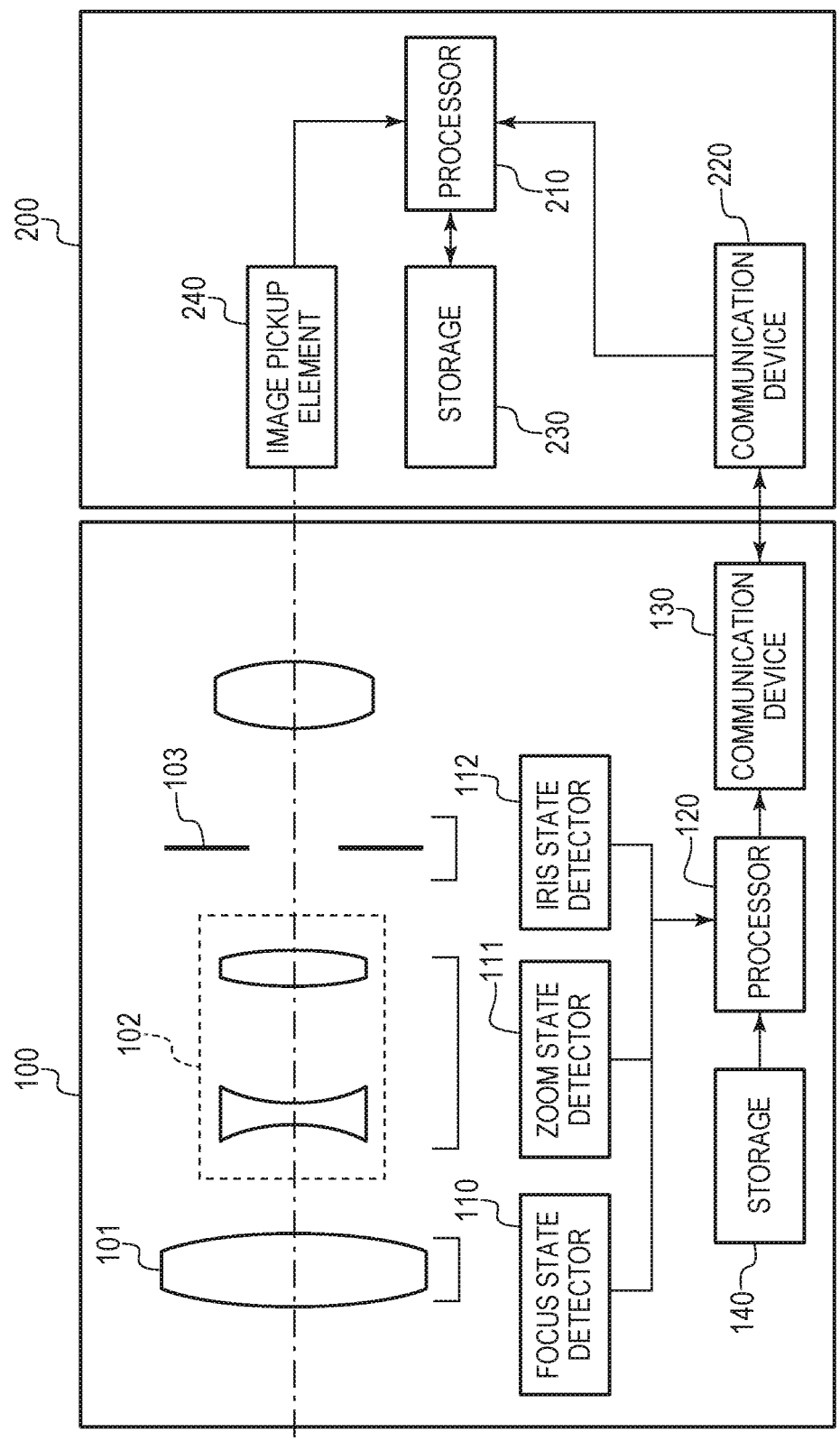
FIG. 1 is a diagram for illustrating a configuration example of an image pickup apparatus according to a first embodiment of the disclosure.

Now, embodiments of the disclosure are described with reference to the attached drawings. Throughout all the drawings for illustrating the embodiments, in principle (unless otherwise specified), like components or the like are denoted by like reference numerals, and a repetitive description thereof is omitted.

First Embodiment

FIG. 1 is a diagram for illustrating a configuration example of an image pickup apparatus according to a first embodiment of the disclosure. The image pickup apparatus is configured such that a lens apparatus 100 is detachably mounted to a camera apparatus 200. A focus lens unit 101 is configured to move for focusing. The focus lens unit may have a function of so-called inner focusing or floating focusing, in which a sub-unit of the focus lens unit moves for focusing. A zoom lens unit 102 is configured to move for zooming. The zoom lens unit may include three or more lens sub-units configured to move for zooming. An aperture stop 103 has an aperture diameter that can be changed in accordance with zooming or an operation performed by a user. The aperture stop can be operated continuously.

A detector 110 (hereinafter also referred to as "focus state detector") is configured to detect a state (e.g., position) of the focus lens unit 101. When the focus lens unit 101 includes a plurality of lens sub-units, the detector 110 may detect only the state of any one of those lens sub-units, or may detect the state of each lens sub-unit. A detector 111 (hereinafter also referred to as "zoom state detector") is configured to detect the state (e.g., position) of the zoom lens unit 102. In general, the zoom lens unit 102 consists of two or more lens sub-units, but the detector 111 may detect only the state of any one of those lens sub-units, or may detect the state of each lens sub-unit. A detector 112 (hereinafter also referred to as "iris state detector") is configured to detect the state (e.g., aperture diameter or effective F-number) of the aperture stop 103. An extender lens unit to be inserted into an optical path to shift the focal length range of the zoom lens unit and a detector (hereinafter also referred to as "insertion/removal state detector") configured to detect the state of insertion/removal of the extender lens unit may be added.

Further, an image stabilizing lens unit for correcting image stabilization (for stabilization of image) and a detector (hereinafter also referred to as "image stabilizing state detector") configured to detect the state (e.g., position) of the image stabilizing lens unit may be added. Light amount correction in which asymmetry of the relative illumination is taken into consideration may be performed based on a relationship between an amount of variation of the image stabilizing lens unit with respect to the optical axis and an amount of variation of the optical axis on an image plane. In any case, the state of the lens apparatus 100 is identified based on each state detected by each detector.

A processor 120 is configured to execute various kinds of processing in the lens apparatus. A communication device 130 is configured to transmit correction data for light amount correction to the camera apparatus 200. A storage 140 stores correction data, and may be formed of a non-volatile memory, for example. The storage 140 stores correction data as a coefficient of a term of each order of an n-th order expression (n is a non-negative integer) with respect to the image height for each state of the lens apparatus identified by states such as a focus state, a zoom state, and an iris state. Details of the correction data are described later. The processor 120, the communication device 130, and the storage 140 may be formed of a single or plurality of logic devices or a combination of a logic device and a storage.

In the camera apparatus 200, a processor 210 is configured to execute various kinds of processing in the camera apparatus. A communication device 220 is configured to communicate to/from the lens apparatus. A storage 230 stores correction data transmitted from the lens apparatus 100. An image pickup element 240 is arranged on the image plane of the lens apparatus, and is configured to convert an image (optical signal) formed by the lens apparatus into an electric signal, and may be formed of a CCD or CMOS device, for example.

In the first embodiment, for example, a correction amount ($\geq 1$) based on an assumption that a light amount of an optical-axis position (position of image height of zero) in a reference state is set as a reference amount (1) is expressed by an n-th order expression (approximation) with respect to the image height for each state of the lens apparatus. That is, a correction amount D is expressed by the following polynomial with respect to the image height "h":

$$D_{(Z,O,P,i)}(h) = \Sigma_{j=0}^{n} A_{j(Z,O,P,i)} h^j \quad (1)$$

where D, "h", Z, O, P, and "i" represent the correction amount, the image height, the zoom state, the focus state, the iris state, and the insertion/removal state of the extender lens unit, respectively, and $A_{j(Z, O, P, i)}$ represents a coefficient of a j-th order term with respect to the image height "h". The term "reference state" herein refers to a state of the lens apparatus identified by, for example, a specific zoom state, a specific focus state, a specific iris state, and a specific insertion/removal state. Specifically, for example, the term "reference state" refers to states such as a wide angle end, focus being at infinity, an aperture stop being open, and an insertion/removal state of the extender lens unit. The reference state may be set for each iris state or each insertion/removal state of the extender lens unit. It is possible to reduce the amount of correction data by representing the correction amount by an n-th order expression with respect to the image height and setting the coefficient as correction data.

When the correction amount D is expressed by a cubic expression with respect to the image height "h", the correction amount D is expressed by:

$$D = A_3 h^3 + A_2 h^2 + A_1 h + A_0$$

where $A_3$, $A_2$, $A_1$, and $A_0$ represents coefficients of third, second, first, and 0th order terms, respectively. The storage 140 stores the third, second, first, and 0th order coefficients $A_3$, $A_2$, $A_1$, and $A_0$ as correction data. The coefficients $A_3$, $A_2$, $A_1$, and $A_0$ are stored for each state of the lens apparatus as described above. In this case, the state may be identified by a finite number of states of the zoom lens unit, the focus lens unit, and the aperture stop and a finite number of states of the extender lens unit. When the current state of the lens apparatus is different from the finite number of states stored in the storage 140, the correction data (correction amount) is generated by interpolation processing. The interpolation processing may be processing of linear interpolation, for example. Further, the linear interpolation may be processing of nearest neighbor interpolation of generating correction data in a state closest to the current state of the lens apparatus among the states of the lens apparatus stored in the storage 140. In this manner, the interpolation processing may be performed by an interpolation method different from linear interpolation.

In one embodiment, the correction amount D be expressed by a quartic expression with respect to the image height. In this case, the correction amount D is expressed by the following expression.

$$D = A_4 h^4 + A_3 h^3 + A_2 h^2 + A_1 h + A_0 \quad (1)$$

The storage 140 stores a coefficient $A_4$, a coefficient $A_3$, a coefficient $A_2$, a coefficient $A_1$, and a coefficient $A_0$, which are coefficients of the fourth-order to 0th-order terms, as correction data. As described above, the coefficient $A_4$, the coefficient $A_3$, the coefficient $A_2$, the coefficient $A_1$, and the coefficient $A_0$ are stored for each state of the lens apparatus. In this case, the state may be identified by, for example, a finite number of states of each of the zoom lens unit, the focus lens unit, and the aperture stop, and a finite number of states of the extender lens unit. The quartic polynomial is more beneficial than a cubic polynomial in terms of approximation for a light amount distribution including a steep change in light amount due to a change in image height in a peripheral portion of an image. Meanwhile, a quintic or higher-order polynomial is more disadvantageous than the quartic polynomial in terms of a period of time required to obtain a correction amount, and is thus more disadvantageous in terms of real-time processing for moving image data.

Now, the correction data according to the first embodiment is described.

The undulation of a correction amount, which is a situation to be solved, may appear in image data after correction as such a light amount distribution in which a relative illumination (a light amount ratio with respect to a center of an image) excessively increases or decreases as the image height changes, or the excessive increase or decrease in relative illumination is repeated. Therefore, correction data is to be generated so as to reduce the undulation of the correction amount.

Figure 12A:
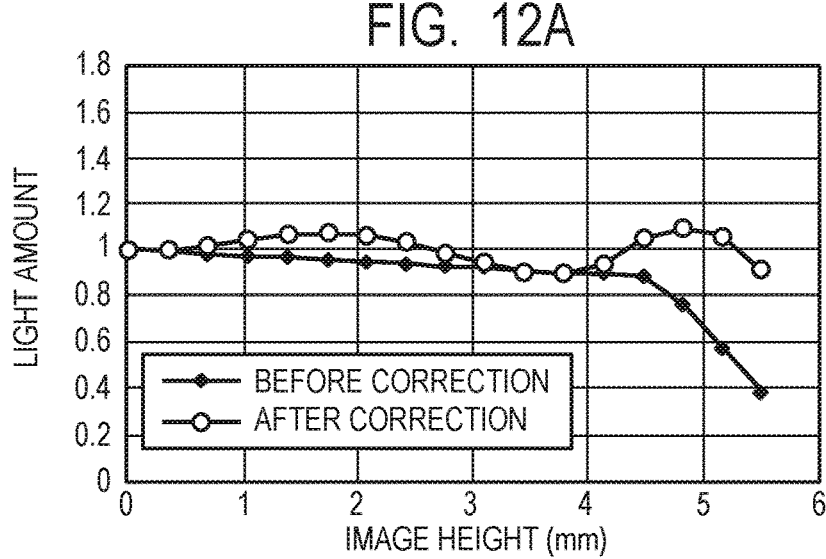
FIG. 12A is a graph for showing a situation to be solved.
Figure 12B:
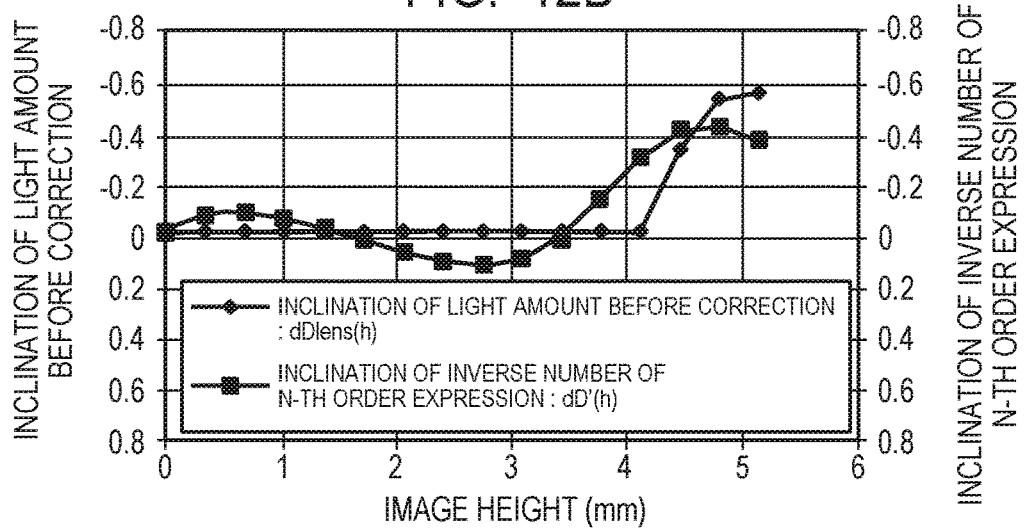
FIG. 12B is a graph for showing a situation to be solved.
Figure 12C:
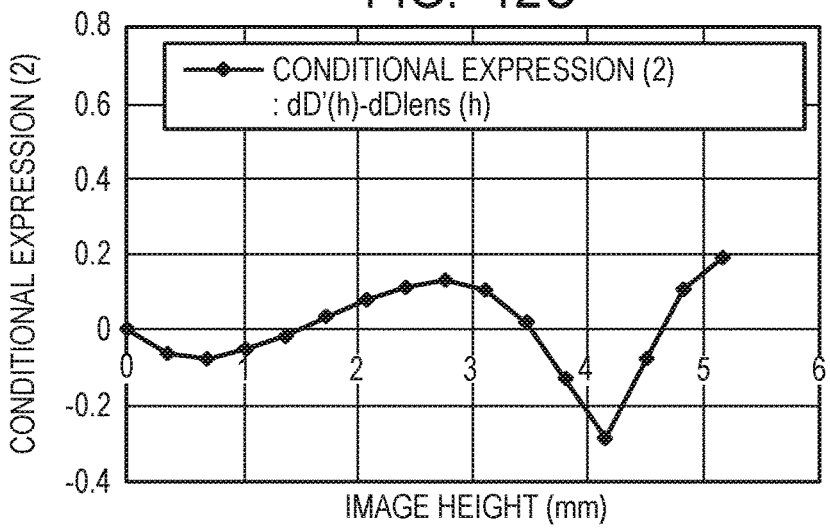
FIG. 12C is a graph for showing a situation to be solved.

FIG. 12A to FIG. 12C are graphs for showing a situation to be solved. In FIG. 12A, there are shown a light amount distribution (before correction) and a light amount distribution (after correction), which exhibit a steep change in light amount (relative illumination) depending on the image height. In FIG. 12B, there is shown an inclination dDlens(h) of a light amount before correction (relative illumination). The inclination dDlens(h) represents a change amount of a light amount at an image height "h" for a value "dh". In this case, the value "dh" represents a predetermined increase amount of the image height "h". In FIG. 12B, there is also shown an inclination dD'(h) of an inverse number of the n-th order expression, which expresses a correction amount exhibiting undulation. The correction amount dD'(h) represents a change amount of the inverse number of the n-th order expression at the image height "h" for "dh". In FIG. 12A, the light amount distribution after correction increases at an image height at which dD'(h) exceeds dDlens(h) in FIG. 12B (dD'(h)<0 and dD'(h)<dDlens(h)). This is because a product of the relative illumination before correction and the value of the n-th order expression is the relative illumination after correction. In FIG. 12C, there is shown a difference between dD'(h) and dDlens(h). The inclination dDlens(h) of the relative illumination of the lens apparatus is expressed as "Dlens(h+dh)−Dlens(h)" through use of a relative illumination Dlens(h) of the lens apparatus. Further, the inclination dD'(h) of the inverse number of the n-th order expression is expressed as "1/D(h+dh)−1/D(h)" through use of the n-th order expression D(h).

The coefficient of the n-th order expression is a coefficient of the n-th order expression satisfying the following inequality (also referred to as "first inequality").

$$-0.15 \leq dD'(h) - dD\text{lens}(h) \leq 1.98 \quad (2)$$

Through satisfaction of Inequality (2), it is possible to prevent the relative illumination after correction from excessively increasing along with an increase in image height, and thus the undulation of the relative illumination after correction can be reduced.

When the value of Inequality (2) falls below the lower limit value thereof, the relative illumination after correction excessively increases along with an increase in image height, which may give a sense of strangeness to an observer of the image. Meanwhile, when the value of Inequality (2) exceeds the upper limit value thereof, the relative illumination after correction is undercorrected.

In general, a decrease in peripheral light amount in a lens apparatus occurs due to vignetting, the cosine fourth law, or distortion, for example. In particular, the relative illumination decreases steeply from an intermediate image height largely due to vignetting. In particular, when the lens apparatus is in a wide-angle state, an off-axial ray at a large image height (high image height) is blocked in many cases by an optical member or a mechanical member of the first lens unit and the second lens unit, and the relative illumination steeply decreases at around the maximum image height (highest image height). Further, in a lens apparatus having a large magnification, in order to downsize the lens apparatus, a change in F-number is small from a wide angle end to a specific intermediate zoom state, and the F-number increases from the specific zoom state to a telephoto end (phenomenon of what is called "F-drop" occurs). In the case of such a lens apparatus, from around a zoom state in which (focal length at which) the F-drop starts to a zoom state on the telephoto end side, the off-axial ray traveling toward a higher image height side than the intermediate image height is blocked due to restriction of an outer diameter of the first lens unit, for example. This causes the relative illumination to steeply decrease on the higher image height side.

Figure 13:
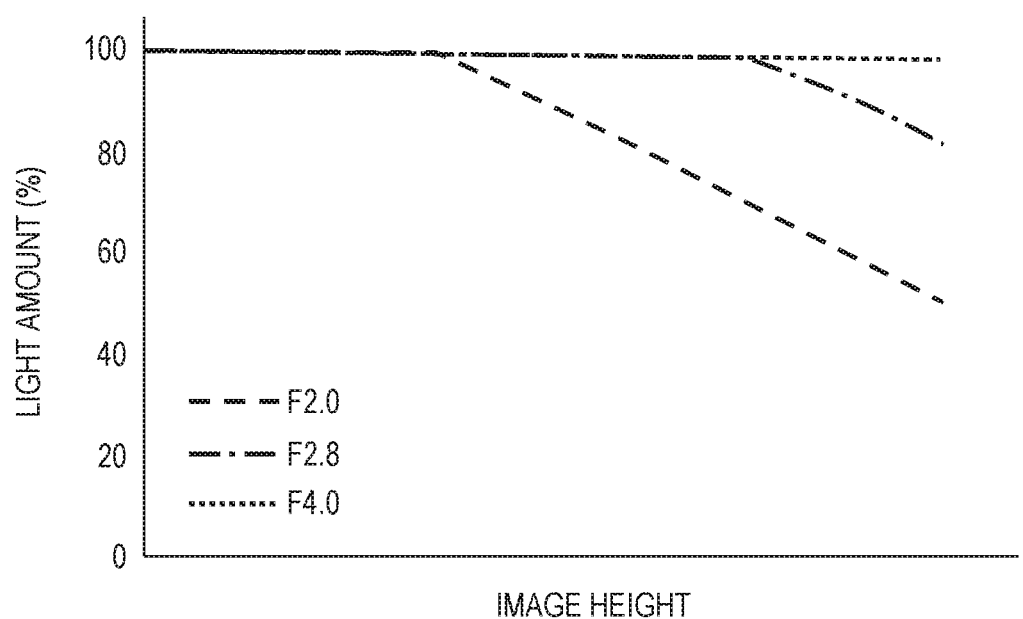
FIG. 13 is a graph for showing a ratio of a light amount at each image height to a light amount at an image height of 0.

In FIG. 13, an example of the above-mentioned decrease is shown. FIG. 13 is a graph for showing a ratio of a light amount at each image height to a light amount at the center of the image (image height of 0) in each of iris states of F2.0, F2.8, and F4.0. When an aperture diameter is reduced, an amount of the light amount drop in the peripheral portion (at the high image height) becomes smaller. The light amount in the peripheral portion changes depending not only on the iris state but also on an operation of zooming and focusing.

In the lens apparatus according to the first embodiment, an open F-number at the wide angle end, an open F-number at the telephoto end, a focal length at the wide angle end, and a focal length at the telephoto end are represented by Fw, Ft, "fw", and "ft", respectively. Further, an open F-number at a focal length "fd" expressed by "fd=Fw/Ft×ft" is represented by Fd. With the above-mentioned definitions, the lens apparatus satisfies the following inequalities.

$$1.10 < Ft/Fd < 4.00 \quad (3)$$

$$-0.01 < (Fd-Fw)/\text{Log}(fd/fw) < 1.20 \quad (4)$$

Inequality (3) defines the range of a ratio of the open F-number at the telephoto end to the open F-number at the focal length "fd". The lens apparatus having a configuration in which the ratio of Inequality (3) falls below the lower limit thereof has an excessively small variation in central light amount compared to the peripheral light amount. Thus, the variation in relative illumination becomes excessively smaller, and an effect of correction in the first embodiment becomes excessively smaller. The lens apparatus having a configuration in which the ratio of Inequality (3) exceeds the upper limit thereof has an excessive emphasis on noise when the light amount at the telephoto end is corrected to about the light amount at the wide angle end.

Inequality (4) defines the range of a ratio of a change in F-number from the focal length "fw" at the wide angle end to the focal length "fd". The lens apparatus having a configuration in which the ratio of Inequality (4) falls below the lower limit thereof can be implemented by excessively increasing an effective diameter of an optical component, for example, the lens, but has a disadvantage in terms of downsizing and downweighting of the lens apparatus. Further, the lens apparatus has a disadvantage in terms of aberrations such as a spherical aberration and a curvature of field. In the lens apparatus having a configuration in which the ratio of Inequality (4) exceeds the upper limit thereof, the F-number changes excessively due to zooming, and thus, unless the number of pieces of correction data is set to be excessively large, an interpolation error of the correction data becomes excessively larger, resulting in overcorrection or undercorrection of the light amount.

Figure 2:
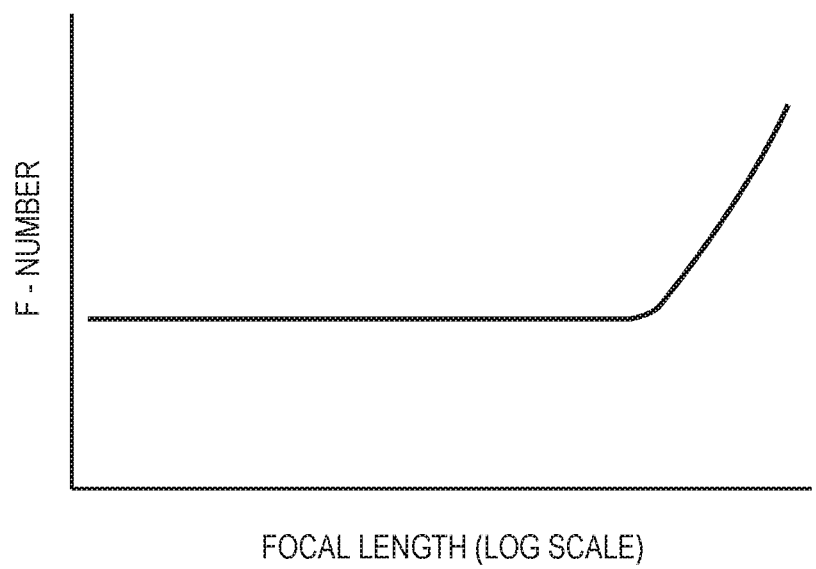
FIG. 2 is a graph for showing an exemplary relationship between a focal length (log scale) and an F-number.

In the lens apparatus satisfying Inequalities (3) and (4), the change in F-number is small in a range of from the wide angle end to a zoom state of the focal length "fd", and the F-number becomes significantly larger in a range of from the zoom state of the focal length "fd" to the telephoto end. This is a so-called "F-drop" phenomenon. In the lens apparatus having such a configuration, which includes a broadcasting lens apparatus, a steep change in relative illumination depending on the image height is significant particularly in a focal length range from around a focal length at which F-drop occurs to the telephoto side. The correction data is to be appropriately generated in view of this point. In FIG. 2, there is shown a change in F-number due to zooming in the lens apparatus satisfying Inequalities (3) and (4). FIG. 2 is a graph for showing an exemplary relationship between a focal length (log scale) and an F-number.

Light amount correction is not limited to correction of reducing the difference between the light amount at the central image height and the light amount at the peripheral image height. For example, the light amount correction also includes correction of, while correcting the light amount at the central image height, which changes depending on the zoom state (focal length), reducing the difference between the light amount at the central image height after correction and the light amount at the peripheral image height.

In the first embodiment, when the maximum image height is represented by Y, the image height "h" satisfying Inequality (2) satisfy the following expression.

$$0.10 \times Y \leq h \leq 0.80 \times Y \qquad (5)$$

Inequality (5) defines a range of the image height in which the undulation of the correction amount is to be reduced. The undulation of the correction amount within this range is likely to be conspicuous. When the value of Inequality (5) falls below the lower limit thereof or exceeds the upper limit thereof, through limitation of the undulation of the correction amount also in an image height range in which the undulation is less likely to be conspicuous, the undulation of the correction amount in the image height range in which the undulation is likely to be conspicuous actually increases.

In the first embodiment, when an inclination of the relative illumination between two points of an image height of zero (image center) and an image height "hn" (peripheral portion of image) is represented by $dDlens\_0n$, and an inclination of the relative illumination between two points of the image height "hn" and the maximum image height Y is represented by $dDlens\_nY$, Inequality (2) is to be satisfied under a state of the lens apparatus (for example, the state of each of the zoom lens unit, the focus lens unit, the aperture stop, and the extender lens unit) having "hn" that satisfies the following expression.

$$0.10 \leq |dDlens\_0n - dDlens\_nY| \qquad (6)$$

Inequality (6) defines a range relating to a state of the lens apparatus in which a change in relative illumination depending on the image height is steep, which is to satisfy Inequality (2). When the undulation of the correction amount is to be reduced also in a state of the lens apparatus in which the value of Inequality (6) falls below the lower limit thereof, the limitation relating to Inequality (2) is unnecessarily imposed on a state of the lens apparatus in which an effect of correction is originally low.

In the first embodiment, when the maximum image height is represented by Y, the image height "hn" satisfying Inequality (6) satisfy the following expression.

$$0.10 \times Y \leq hn \leq 0.80 \times Y \qquad (7)$$

Inequality (7) defines a range of the image height in which the relative illumination steeply changes. When the value of Inequality (7) falls below the lower limit thereof or exceeds the upper limit thereof, the undulation of the correction amount is to be reduced also in an image height range in which an effect of correction is originally low, and thus the undulation of the image height range in which the undulation is likely to be conspicuous increases.

In the first embodiment, when an average value of a product of the relative illumination and the correction amount D at each image height "h" from the image height of zero to the image height "hn" is represented by $Ave\_0n$, and an average value of a product of the relative illumination and the correction amount D at each image height "h" from the image height "hn" to the maximum image height Y is represented by $Ave\_nY$, and that the correction data satisfy the following inequality.

$$Ave\_nY/Ave\_0n \leq 0.95 \qquad (8)$$

Inequality (8) defines a ratio between the average of the relative illumination after correction from the image height of zero to the image height "hn" and the average of the relative illumination after correction from the image height "hn" to the maximum image height Y. Inequality (8) defines that the latter average is not to be overcorrected with respect to the former average. When the ratio of Inequality (8) exceeds the upper limit value thereof, in such a lens apparatus in which the relative illumination steeply changes depending on the image height, the relative illumination after correction undulates at the intermediate image height.

In the first embodiment, when the maximum image height is represented by Y, and that the image height "hn" satisfying Inequality (6) or Inequalities (6) and (8) satisfy the following inequality.

$$0.70 \times Y \leq hn \leq 1.00 \times Y \qquad (9)$$

Inequality (9) defines a range of the image height in which the relative illumination steeply changes. In this range, the area within the image is relatively small, and thus a decrease in relative illumination after correction is less likely to be conspicuous. When the value of Inequality (9) falls below the lower limit value thereof, undercorrection becomes disadvantageously conspicuous.

In order to reduce the undulation of the correction amount, correction data is generated such that the correction data does not have a correction amount with which the relative illumination excessively increases or decreases as the image height changes, or with which the excessive increase or decrease in relative illumination repeatedly occurs. When the correction data is expressed by an n-th order expression, in general, the n-th order expression has n−1 or less extreme values. Now, when there are a plurality of extreme values, two extreme values at which respective values of image heights are adjacent to each other are considered. In this case, for the two extreme values, when the difference between two image heights falls within a specific range (range that is not excessively small or excessively large), and the difference (absolute value) between the two extreme values exceeds an allowable value, the correction amount excessively undulates.

For example, when the correction amount is expressed by a quartic expression, the number of extreme values is three or less, and the correction amount has an extreme value at an image height "h" satisfying the following expression.

$$dD/dh(h)=4A_4h^3+3A_3h^2+2A_2h+A_1=0$$

When two image heights at which the correction amount takes two adjacent extreme values are represented by h1 and h2, respectively, dD/dh(h1)=0 and dD/dh(h2)=0 are satisfied. Accordingly, each of the coefficients $A_1$ and $A_2$ can be expressed through use of the coefficients $A_3$ and $A_4$ and the image heights h1 and h2. When the above-mentioned allowable value is represented by C, the relationship between the difference between the two extreme values (|D(h2)−D(h1)|) and the allowable value C can be expressed by the following expression through use of the sum of h1 and h2 and the difference therebetween and the coefficients $A_3$ and $A_4$ of the high-order terms.

$$|D(h2)-D(h1)|=|(0.5\times(h1-h2)^3)A_3+(0.5\times(h1-h2)^3\times2(h1+h2))A_4|\leq C$$

That is, when there are two extreme values whose difference exceeds the allowable value C at an image height interval within a specific range that is not excessively small or excessively large with respect to the magnitude of the maximum image height Y, the correction amount may give a sense of strangeness to the observer of the image as the undulation of the correction amount.

In the first embodiment, the coefficient $A_4$ of the fourth-order term and the coefficient $A_3$ of the third-order term of the quartic expression (1) expressing the correction amount D satisfy the following inequality.

$$-0.10<A_3+2Y\times A_4<0.10 \quad (10)$$

When the value of Inequality (10) falls below the lower limit thereof or exceeds the upper limit thereof, overcorrection or undercorrection occurs, and thus annular unevenness of brightness occurs in the image.

In general, except for the maximum image height, at which a steep change in peripheral light amount depending on the image height is exhibited due to vignetting, the inclination of the relative illumination in the lens apparatus between the image height of zero (image center) and the image height "hn" (peripheral portion of image) can be regarded as being substantially constant. Thus, when the correction data is generated in consideration of an image height range to a specific image height "hn" while allowing a steep change in peripheral light amount at around the maximum image height, at which the undulation is less likely to be conspicuous, the coefficient of a high-order term of the n-th order expression is a relatively small value. When the value of the coefficient of a high-order term is made relatively small, although a correction effect at the maximum image height and an image height around the maximum image height becomes lower, the undulation of the correction amount at the intermediate image height can be reduced. Therefore, in the first embodiment, the following inequalities be satisfied.

$$|A_4|\leq 0.0020 \quad (11)$$

$$|A_3|\leq 0.0150 \quad (12)$$

Inequalities (11) and (12) define the respective coefficients of the high-order terms of the n-th order expression. In the state of the lens apparatus in which the relative illumination steeply changes depending on the image height, the undulation of the correction amount can be reduced (limited within the allowable range) by setting the values of the coefficients within the respective ranges given above. When the values of Inequalities (11) and (12) exceed the respective upper limits thereof, in the state of the lens apparatus in which the relative illumination steeply changes depending on the image height, it becomes difficult to achieve both reduction of the undulation of the correction amount and suitable correction.

In the first embodiment, when the maximum image height is represented by Y, the image height "hn" satisfying Inequalities (11) and (12) and satisfying Inequality (6) satisfy the following inequality.

$$0.70\times Y\leq hn<1.00\times Y \quad (13)$$

Inequality (13) defines an image height at which the relative illumination steeply changes. In one embodiment, the steep change be limited within the image height range around the maximum image height. In the case where the correction amount is expressed by an n-th order expression being a low-order expression, when the relative illumination decreases from an image height that is relatively close to the center of the image (image height of zero), undercorrection of the relative illumination becomes conspicuous. When the value of Inequality (13) falls below the lower limit value thereof, undercorrection becomes disadvantageously conspicuous.

In the first embodiment, when a value of a second derivative at each image height "h" of the product of the relative illumination and the correction amount D at each image height "h" from the image height of zero to the image height "hn" is represented by ddAve, and a coefficient of the 0th-order term of the quartic expression (1) is represented by $A_0$, the following inequality be satisfied at each image height "h".

$$|ddAve/A_0|\leq 0.50 \quad (14)$$

Inequality (14) defines a magnitude of the change in inclination of the relative illumination after correction from the image height of zero to the image height "hn". Inequality (14) indicates that the magnitude of the change in inclination of the relative illumination after correction is gentle. When the value of Inequality (14) is out of the range thereof, the change in inclination of the relative illumination after correction becomes disadvantageously unallowable.

The first embodiment may include a user interface device (adjusting device) enabling setting of a correction coefficient to be multiplied by an n-th order term. With this, it is possible to adjust the correction amount in accordance with, for example, the degree of appearance of image noise. For example, in the case of a lens apparatus having a large F-drop, it is possible to reduce (uniformly reduce light amounts at all corrected image heights) the correction amount in a telephoto state, to thereby reduce the noise. This can be implemented by multiplying the same correction coefficient (<1) by all the terms of an n-th order polynomial including a constant term in this state. Further, for example, in the case of a lens apparatus having a greatly decreased peripheral light amount, it is possible to alleviate noise of a peripheral portion of the image while maintaining the light amount of the center of the image (image height of zero). This can be implemented by multiplying the same correction coefficient (<1) by all the terms of an n-th order polynomial other than a constant term. A correction coefficient larger than 1 may be adopted to improve a light amount correction effect or obtain an effect for visual representation, for example.

In the first embodiment, switching of whether the communication device of the lens apparatus transmits correction data to the communication device of the camera apparatus is enabled. This enables execution of selective correction as required. Further, in the first embodiment, the communication device transmit correction data on the zoom state and the iris state among the zoom state, the focus state, and the iris state to an external apparatus, for example, the camera apparatus. The variation in relative illumination due to a change in focus state is smaller than that due to a change in zoom state or iris state. Thus, it is possible to reduce the data size required for correction by transmitting only the correction data on the zoom state and the iris state to the external apparatus.

In the first embodiment, the aperture stop and a lens unit closer to the image side than the aperture stop not move for zooming. When the aperture stop and the lens unit closer to the image side than the aperture stop move for zooming, the F-number changes due to the zooming, and as a result, the light amount at the center of the image and the light amount at the peripheral portion of the image change excessively, which is likely to cause overcorrection or undercorrection. Further, in the first embodiment, the diameter of the aperture stop not to be changed due to zooming or focusing. Further, in the first embodiment, a first lens unit closest to the object side is a lens unit configured not to move for zooming, and may include a lens sub-unit configured to move for focusing. With this, the variation in relative illumination is not steep with respect to the changes in respective states of the zoom lens unit, the focus lens unit, and the stop, and thus it is possible to provide a lens apparatus that is beneficial in that the amount of correction data is small or the correction accuracy is high. Further, when the focus lens unit moves also for zooming, the focal length also changes in order to change the object distance, and the light amount at the center of the image and the light amount at the peripheral portion change excessively, which is likely to cause overcorrection or undercorrection.

In the first embodiment, when a focal length of the first lens unit of the lens apparatus is represented by f1, a focal length of the second lens unit of the lens apparatus is represented by f2, and a focal length of the lens apparatus at the wide angle end is represented by "fw", the following inequalities be satisfied.

$$2.0 < f1/fw < 35.0 \quad (15)$$

$$-15.0 < f1/f2 < -1.2 \quad (16)$$

Inequalities (15) and (16) define conditions to be satisfied by a lens apparatus having a wide angle of view and a large magnification, which is greatly affected by vignetting. When the ratios of the above-mentioned inequalities are out of the respective ranges, a change in relative illumination due to a change in image height is not considered as being steep, and thus a sufficient effect cannot be exerted. There is also a disadvantage in terms of reduction of the size and weight of the first lens unit and reduction of the size and weight of the lens apparatus in achieving the lens apparatus having a wide angle of view and a large magnification.

In the first embodiment, under the open state of the aperture stop, the following inequalities are satisfied:

$$1.21 < A_{0(ft)}/A_{0(fd)} < 16.0 \quad (17); \text{ and}$$

$$-0.01 < (A_{0(fd)} - A_{0(fw)})/\text{Log}(fd/fw) < 0.50 \quad (18),$$

where "fw", $A_{0(fw)}$, $A_{0(ft)}$, and $A_{0(fd)}$ represent the focal length at the wide angle end, the coefficient $A_0$ at the focal length "fw", the coefficient $A_0$ at the focal length "ft", and the coefficient $A_0$ at the focal length "fd", respectively. In a lens apparatus in which the first lens unit is a lens unit configured not to move for zooming and the first lens unit includes a lens sub-unit configured to move for focusing, the F-number ray on the telephoto side is defined by a lens diameter of the first lens unit. In this case, the light amount can be corrected by satisfying the following conditions.

$$A_{0(fd)} < A_{0(ft)} \quad (19)$$

$$A_{0(fw)} = A_{0(fd)} \quad (20)$$

FIG. 2 is an illustration of a change in F-number in a lens apparatus having characteristics of Inequalities (15) and (16) as well as characteristics of Inequalities (3) and (4). In a lens apparatus in which the first lens unit is configured not to move for zooming and the F-number ray on the telephoto side is defined by the lens diameter of the first lens unit, as shown in FIG. 2, the F-number is set to be a fixed value in the range of from the wide angle end to the zoom state of a predetermined focal length. Thus, the lens apparatus satisfies Inequalities (19) and (20). However, an image (video) to be visually recognized by the user is influenced by the characteristic of the camera apparatus including a characteristic of an image pickup element and processing on a signal transmitted from the camera apparatus, for example. Further, when correction is performed based on limited data due to a restriction on a capacity of communication or storage, an error of interpolation processing occurs, and thus Inequalities (19) and (20) may not always be satisfied. In such a case, Inequalities (17) and (18) may be satisfied.

In the first embodiment, an extender lens unit and a detector be configured to detect an insertion/removal state of the extender lens unit be included, to switch correction data based on the insertion/removal state. In a lens apparatus including the extender lens unit, the F-number changes depending on the insertion/removal state of the extender lens unit, and the relative illumination also changes. Thus, it is possible to perform more accurate correction by switching correction data based on the insertion/removal state with individual pieces of correction data in respective states of insertion/removal of the extender lens unit.

In one embodiment, the numerical ranges of Inequalities (2), (3), (4), (5), (6), (7), (8), (9), (10), (11), (12), (13), (14), (17), and (18) be set as follows.

$$-0.10 \leq dD'(h) - dDlens(h) \leq 1.50 \quad (2a)$$

$$1.10 < Ft/Fd < 3.80 \quad (3a)$$

$$-0.01 < (Fd-Fw)/\text{Log}(fd/fw) < 1.00 \quad (4a)$$

$$0.20 \times Y \leq h \leq 0.70 \times Y \quad (5a)$$

$$0.11 \leq |dDlens\_0n - dDlens\_nY| \quad (6a)$$

$$0.20 \times Y \leq hn \leq 0.70 \times Y \quad (7a)$$

$$\text{Ave}\_nY/\text{Ave}\_0n \leq 0.90 \quad (8a)$$

$$0.80 \times Y \leq hn < 1.00 \times Y \quad (9a)$$

$$-0.05 \leq A_3 + 10 \times A_4 < 0.05 \quad (10a)$$

$$|A_4| \leq 0.0010 \quad (11a)$$

$$|A_3| \leq 0.0100 \quad (12a)$$

$$0.80 \times Y \leq hn < 1.00 \times Y \quad (13a)$$

$$|dd\text{Ave}/A_0| \leq 0.45 \quad (14a)$$

$$1.21 < A_{0(fi)}/A_{0(fd)} < 14.0 \quad (17a)$$

$$-0.01 < (A_{0(fd)} - A_{0(fw)})/\text{Log}(fd/fw) < 0.40 \quad (18a)$$

Further, in yet another embodiment, the numerical ranges of Inequalities (2), (3), (4), (5), (6), (7), (8), (9), (10), (11), (12), (13), (14), (17), and (18) be set as follows.

$$-0.05 \leq dD'(h) - dDlens(h) \leq 1.00 \quad (2b)$$

$$1.20 < Ft/Fd < 3.50 \quad (3b)$$

$$-0.01 < (Fd-Fw)/\text{Log}(fd/fw) < 0.50 \quad (4b)$$

$$0.30 \times Y \leq h \leq 0.60 \times Y \quad (5b)$$

$$0.12 \leq |dDlens\_0n - dDlens\_nY| \quad (6b)$$

$$0.30 \times Y \leq hn \leq 0.60 \times Y \quad (7b)$$

$$\text{Ave}\_nY/\text{Ave}\_0n \leq 0.85 \quad (8b)$$

$$0.90 \times Y \leq hn < 1.00 \times Y \quad (9b)$$

$$-0.02 \leq A_3 + 10 \times A_4 < 0.02 \quad (10b)$$

$$|A_4| \leq 0.0006 \quad (11b)$$

$$|A_3| \leq 0.0050 \quad (12b)$$

$$0.90 \times Y \leq hn < 1.00 \times Y \quad (13b)$$

$$|dd\text{Ave}/A_0| \leq 0.25 \quad (14b)$$

$$1.44 < A_{0(fi)}/A_{0(fd)} < 12.25 \quad (17b)$$

$$-0.01 < (A_{0(fd)} - A_{0(fw)})/\text{Log}(fd/fw) < 0.20 \quad (18b)$$

Figure 3:
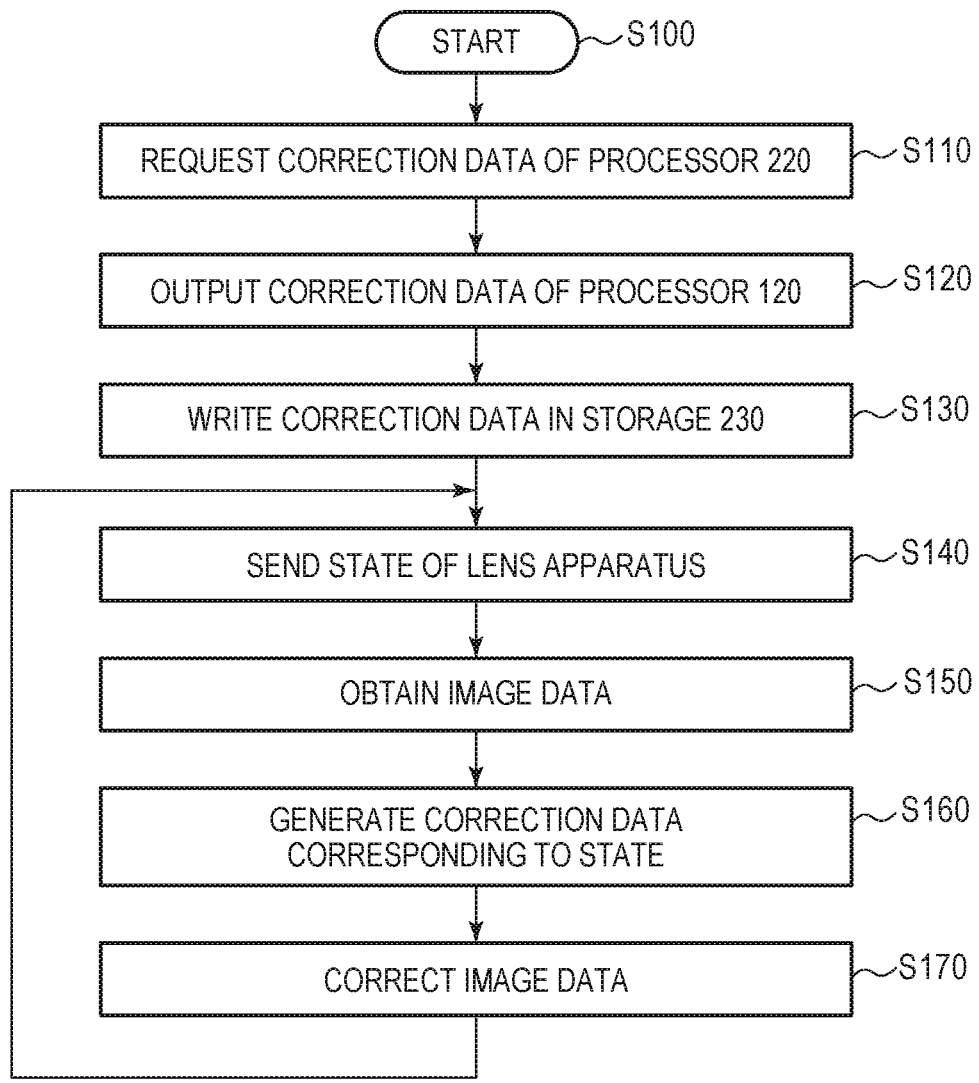
FIG. 3 is a diagram for illustrating an exemplary flow of processing in the first embodiment.

FIG. 3 is a flowchart for illustrating an exemplary flow of processing in the first embodiment. In Step S100, the processing is started. In Step S110, first, the processor 210 of the camera apparatus 200 requests the processor 120 of the lens apparatus 100 for correction data via the communication device 220 of the camera apparatus 200 and the communication device 130 of the lens apparatus 100. In Step S120, the processor 120 of the lens apparatus 100 reads correction data from the storage 140. Then, the processor 120 outputs the correction data to the processor 210 of the camera apparatus 200 via the communication device 130 of the lens apparatus 100 and the communication device 220 of the camera apparatus 200. In Step S130, the processor 210 of the camera apparatus 200 writes the received correction data in the storage 230.

The subsequent processing is processing for one frame of an image (video). In Step S140, the processor 120 of the lens apparatus 100 obtains respective states (states of lens apparatus) from the focus state detector 110, the zoom state detector 111, and the iris state detector 112. Then, the processor 120 of the lens apparatus 100 outputs the states of the lens apparatus to the processor 210 of the camera apparatus 200 via the communication device 130 of the lens apparatus 100 and the communication device 220 of the camera apparatus 200.

In Step S150, the processor 210 of the camera apparatus 200 receives image data (video data) from the image pickup element 240. In Step S160, the processor 210 of the camera apparatus reads correction data corresponding to the state of the lens apparatus received in Step S140 from the storage 230 of the camera apparatus 200. The correction data stored in the storage 230 of the camera apparatus 200 is discrete pieces of data for respective states of the focus state, the zoom state, and the iris state. Thus, when the processor 210 of the camera apparatus 200 has identified the state of the lens apparatus, the processor 210 generates correction data corresponding to the identified state by interpolation processing based on the read correction data. In Step S170, the processor 210 of the camera apparatus 200 generates a correction amount based on the generated correction data, and corrects image data based on the correction amount. After that, the processing returns to Step S140, and the processing is continued until a predetermined end condition is satisfied.

Figure 4:
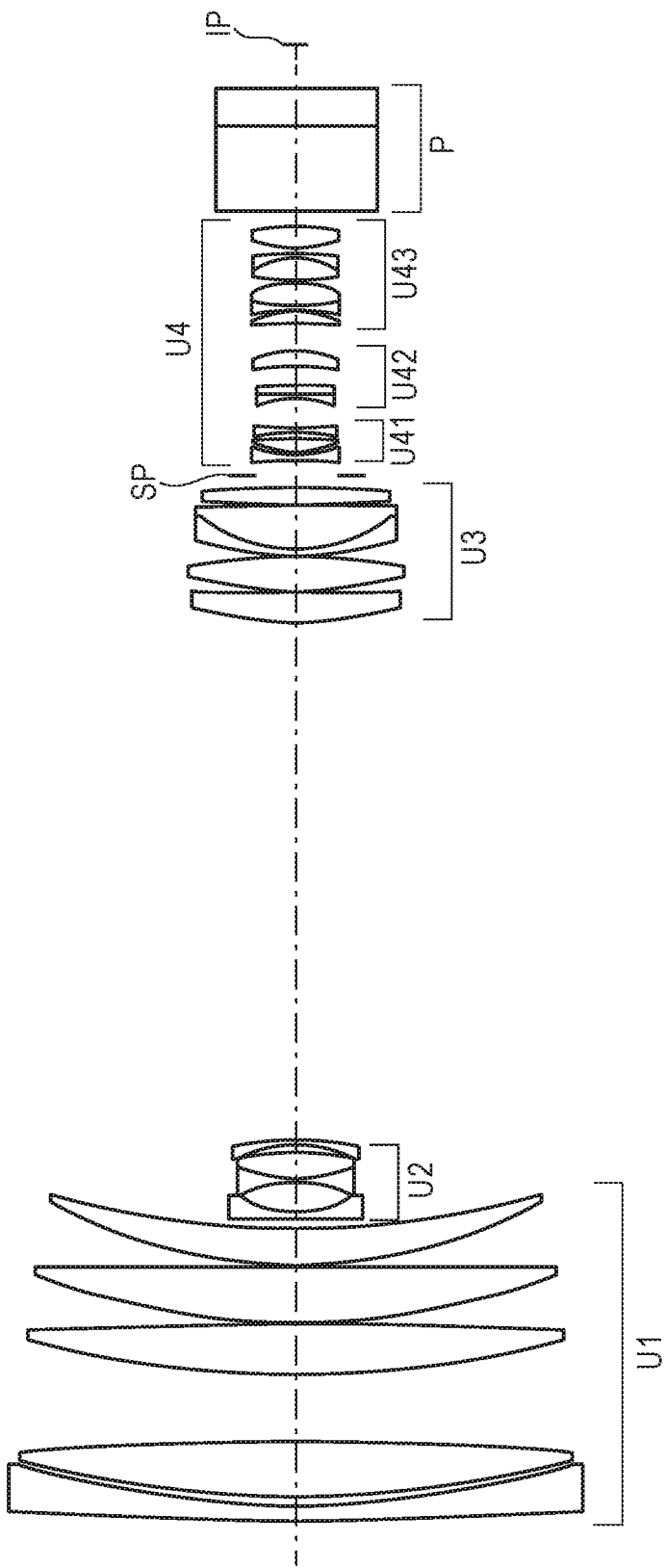
FIG. 4 is a diagram for illustrating an exemplary optical system of a lens apparatus.

Now, a configuration of the optical system of the lens apparatus according to the first embodiment is described. FIG. 4 is a diagram for illustrating an exemplary optical system of the lens apparatus. FIG. 4 is a cross-sectional view of the optical system in the state in which focus is at infinity at the wide angle end. In FIG. 4, a first lens unit U1 having a positive refractive power is configured not to move for zooming. A part of the first lens unit of U1 is configured to move toward the object side for focusing from the infinity toward close distance. A second lens unit U2 having a negative refractive power is configured to move toward the image side for zooming from the wide angle end (short focal length end) to the telephoto end (long focal length end).

A third lens unit U3 having a positive refractive power is configured to move in association with the second lens unit U2 to correct (compensate for) image plane variation due to magnification. The aperture stop is denoted by SP. A fourth lens unit U4 having a positive refractive power consists of, in order from the object side, a first lens sub-unit, a second lens sub-unit, and a third lens sub-unit having a positive refractive power. Although the fourth lens unit U4 is configured not to move for zooming, all or a part of the fourth lens unit U4 may be configured to move to correct (reduce) image blur due to various kinds of causes. An optical block P includes at least one of a prism, an optical filter, or other components. An image plane of the lens apparatus is denoted by IP, and when the lens apparatus is connected to the camera apparatus, an image pickup element (photoelectric conversion element) is arranged on the image plane IP.

Next, a configuration of each lens unit is described. The first lens unit U1 consists of, in order from the object side to the image side, a negative lens, a positive lens, a positive lens, a positive lens, and a positive lens. The three positive lenses closest to the image side are configured to move from the image side to the object side for focusing. The second lens unit U2 consists of, in order from the object side to the image side, a negative lens, a cemented lens of a negative lens and a positive lens, and a negative lens. The third lens unit U3 consists of, in order from the object side to the image side, a positive lens, a positive lens, a cemented lens of a negative lens and a positive lens, and a positive lens. The first lens sub-unit U41 consists of, from the object side to the image side, a negative lens, a positive lens, and a negative lens. The second lens sub-unit U42 consists of, from the object side to the image side, a cemented lens of a negative lens and a positive lens, and a positive lens. The third lens sub-unit U43 consists of, from the object side to the image side, a positive lens, a cemented lens of a negative lens and a positive lens, a cemented lens of a positive lens and a negative lens, and a positive lens.

Numerical Embodiment of the optical system of the lens apparatus 100 is as described later. In Numerical Embodiment, an order of a surface from the object side is represented by "i". A curvature radius of an i-th surface from the object side is represented by "ri", and an interval between an i-th surface and an (i+1)th surface from the object side is represented by "di". A refractive index and an Abbe number of an optical component (optical medium) between the i-th surface and the (i+1)th surface are represented by "ndi" and "vdi", respectively. An air-equivalent back focus is represented by BF. The last three surfaces are surfaces in a glass block, for example, a filter. In Numerical Embodiment, the asterisk (*) attached to the surface number indicates that the surface is aspherical.

The aspherical shape is expressed by setting an X axis in the optical axis direction, an H axis in a direction perpendicular to the optical axis, and defining the direction of travel of light as positive. Further, a paraxial curvature radius is represented by R, a conic constant is represented by "k", and aspherical coefficients are represented by A4, A6, A8, ..., A16, A3, A5, A7, ..., and A15, to express the aspherical shape by the following expression. Further, "e-Z" represents "$\times 10^{-Z}$".

$$X = \frac{H^2/R}{1+\sqrt{1-(1+k)(H/R)^2}} + A4H^4 + A6H^6 +$$
$$A8H^8 + A10H^{10} + A12H^{12} + A14H^{14} + A16H^{16} + A3H^3 +$$
$$A5H^5 + A7H^7 + A9H^9 + A11H^{11} + A13H^{13} + A15H^{15}$$

In Table 1, Numerical Embodiment of the correction data (coefficients) is shown, and in Table 2 to Table 7, values relating to each conditional expression are shown. FIG. 5A to FIG. 5D are graphs each for showing light amount distributions (relative illuminations) before and after correction. In FIG. 5A to FIG. 5D, there are shown relative illuminations in the state in which the second lens sub-unit is inserted into the optical path in the zoom lens in Embodiment of the disclosure. In FIG. 5A, FIG. 5B, FIG. 5C, and FIG. 5D, there are shown relative illuminations in the following states: an open aperture, the zoom lens being focused on infinity, and the wide angle end; the open aperture, the zoom lens being focused on infinity, and a focal length of 348.30 mm; the open aperture, the zoom lens being focused on infinity, and the telephoto end; and an iris state of F/2.088, the zoom lens being focused on infinity, and a focal length of 348.30 mm, respectively. There are shown the relative illumination before correction and the relative illumination after correction exhibited when the correction amount is approximated by a quartic expression. Those are results obtained by correcting the light amount at the center of the image and correcting the relative illumination, and the light amount at the center of the image is set as 100%. It can be understood from FIG. 5A to FIG. 5D that, through the execution of the correction processing described in the first embodiment, the relative illumination is suitably corrected after the correction as compared with that before the correction.

Figure 5A:
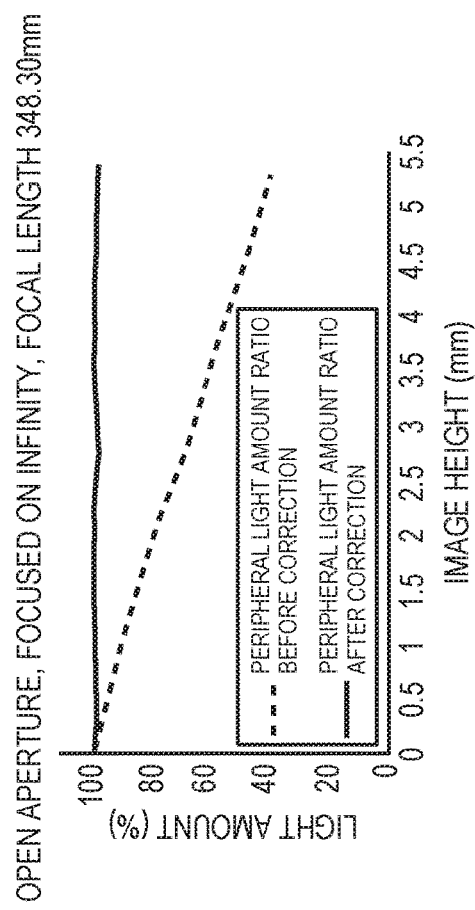
FIG. 5A is a graph for showing exemplary light amount distributions before and after correction.
Figure 5B:
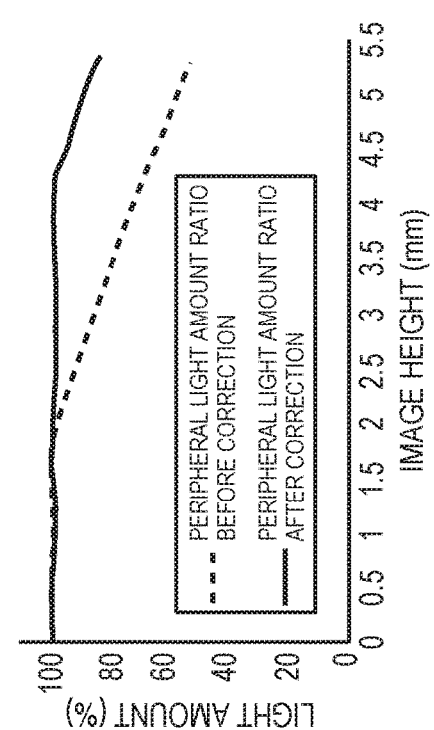
FIG. 5B is a graph for showing exemplary light amount distributions before and after correction.
Figure 5C:
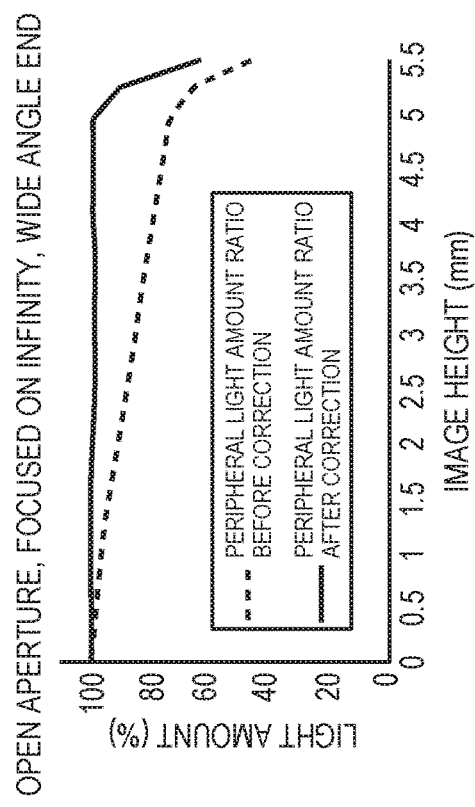
FIG. 5C is a graph for showing exemplary light amount distributions before and after correction.
Figure 5D:
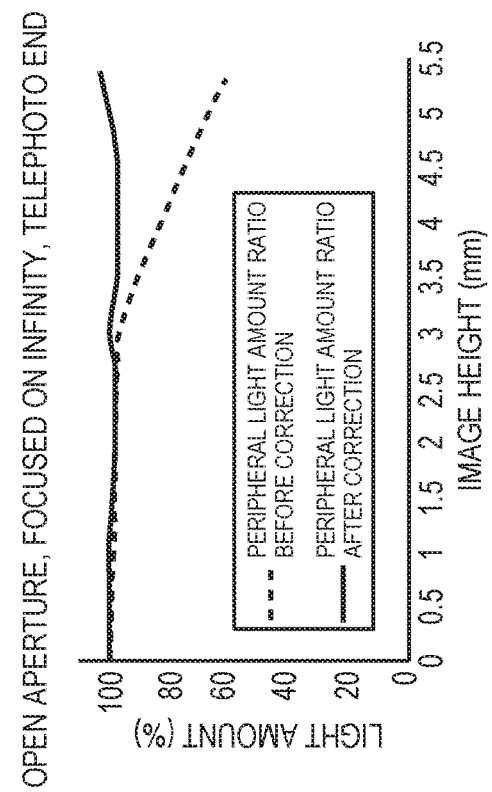
FIG. 5D is a graph for showing exemplary light amount distributions before and after correction.

In the state of FIG. 5A of the wide angle end and the state of FIG. 5D of the reduced aperture diameter and the focal length of 348.30 mm, divergence of the light amount from 100% at around the maximum image height becomes conspicuous as a result of preventing the correction amount from undulating for a steep change in relative illumination. As exemplified in FIG. 5A to FIG. 5D, through the correction with the correction data according to the first embodiment, the relative illumination can suitably be corrected with a small amount of data. In Numerical Embodiment, through the correction that satisfies Inequalities (2) to (18), the undulation of the light amount (brightness) is small from the center of the image to the peripheral portion thereof, and thus high uniformity of the light amount is achieved.

Second Embodiment

Figure 6:
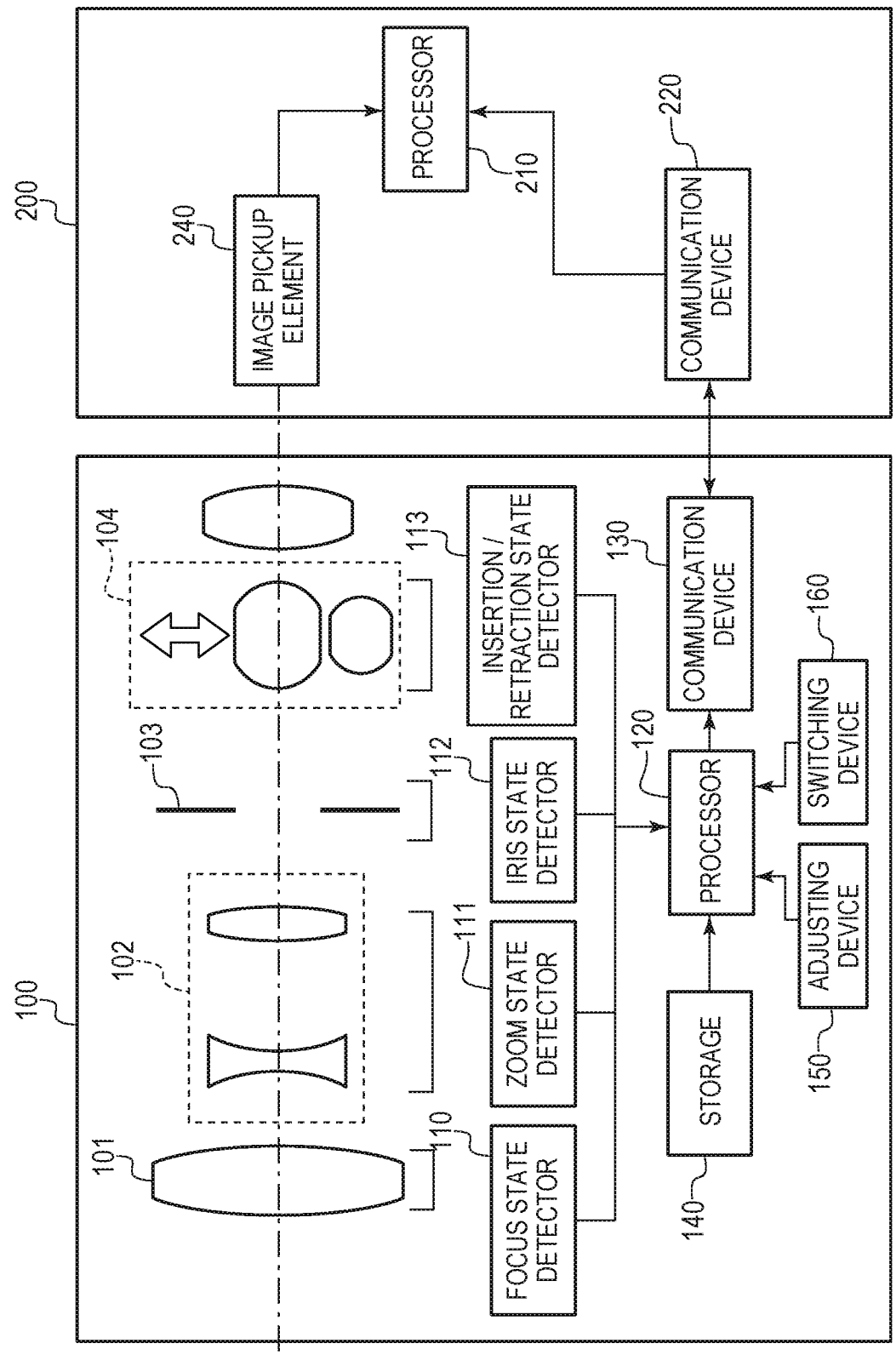
FIG. 6 is a diagram for illustrating a configuration example of an image pickup apparatus according to a second embodiment of the disclosure.

FIG. 6 is a diagram for illustrating a configuration example of an image pickup apparatus according to a second embodiment of the disclosure. A difference from the exemplary configuration of the image pickup apparatus according to the first embodiment is that the image pickup apparatus includes an extender lens unit 104, and the extender lens unit 104 can selectively be inserted or removed into/from the optical path. Further, another difference is that the image pickup apparatus includes an insertion/removal state detector 113 configured to detect an insertion or removal state of the extender lens unit 104. Further, another difference is that the image pickup apparatus includes an adjusting device 150 configured to adjust the correction amount and a switching device 160 for switching ON/OFF of transmission of correction data. The adjusting device 150 and the switching device 160 each serve as a user interface device. Similarly to the first embodiment, the correction amount is expressed by a cubic expression or a quartic expression (Expression (1)) with respect to the image height. The adjusting device 150 can set an adjustment coefficient to be multiplied by all the coefficients of the cubic expression or the quartic expression (Expression (1)) in order to adjust the degree of correction of the F-drop. Further, the adjusting device 150 can set an adjustment coefficient to be multiplied by all the coefficients of the terms other than constant terms of the cubic expression or the quartic expression (Expression (1)) in order to adjust the degree of correction of the peripheral light amount.

Further, the second embodiment is different from the first embodiment in that the lens apparatus transmits correction data corresponding to the states of the lens apparatus (state of each of the focus lens unit, the zoom lens unit, the aperture stop, and the extender lens unit) to the camera apparatus. Further, as a result, the second embodiment is different from the first embodiment in that the camera apparatus 200 does not include a storage configured to store data for obtaining correction data by interpolation processing.

Figure 7:
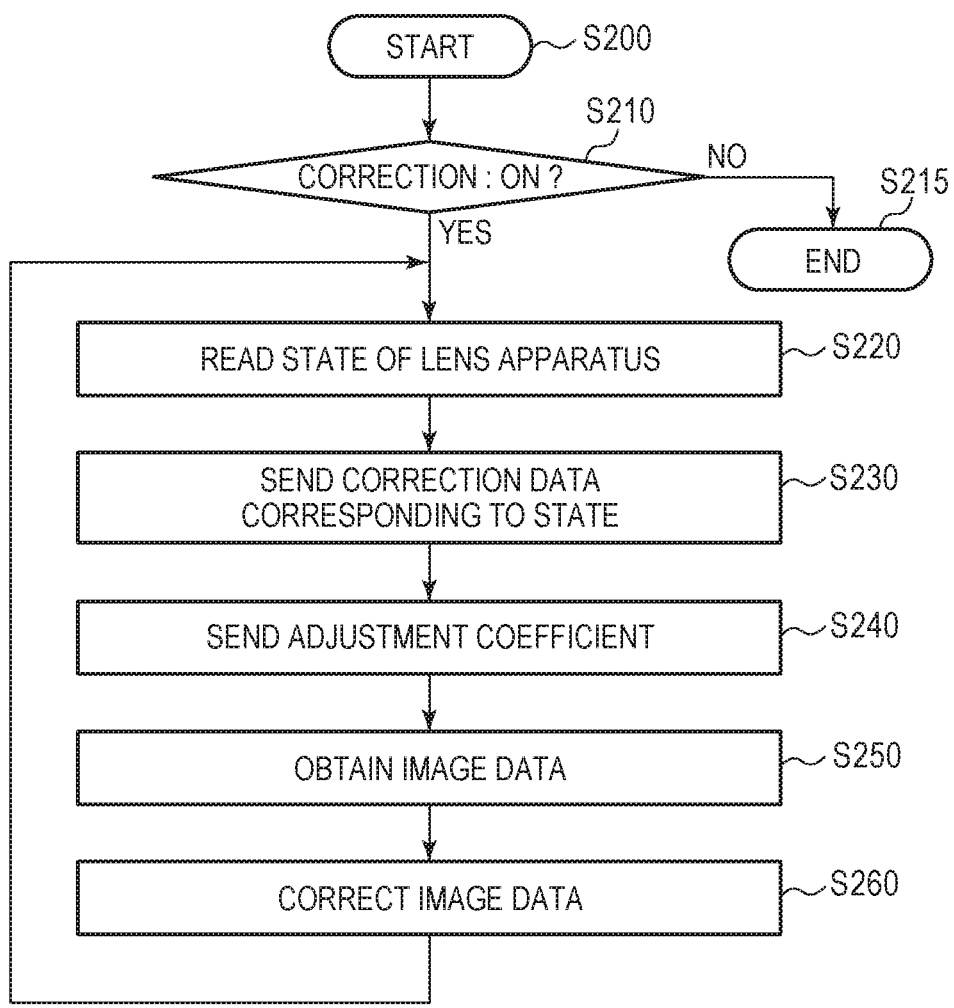
FIG. 7 is a diagram for illustrating an exemplary flow of processing in the second embodiment.

FIG. 7 is a diagram for illustrating an exemplary flow of processing in the second embodiment. In Step S200, the processing is started. In Step S210, the state of the switching device 160 is obtained first, and when the state is ON for transmission of correction data, the processing proceeds to Step S220. Further, when the state is OFF for transmission of correction data, the processing proceeds to Step S215 and ends. The subsequent processing is processing for one frame of an image (video).

In Step S220, the processor 120 of the lens apparatus 100 obtains respective states from the focus state detector 110, the zoom state detector 111, the iris state detector 103, and the insertion/removal state detector 113. In Step S230, the processor 120 of the lens apparatus 100 reads correction data corresponding to each state (state of lens apparatus) from the storage 140. Then, the processor 120 transmits the correction data to the processor 210 of the camera apparatus 200 via the communication device 130 of the lens apparatus 100 and the communication device 220 of the camera apparatus 200. The correction data stored in the storage 140 is discrete pieces of correction data relating to the state of each of the focus lens unit, the zoom lens unit, and the aperture stop. Thus, when each of the state of the focus lens unit, the zoom lens unit, and the aperture stop is identified, the processor 120 of the lens apparatus 100 generates correction data corresponding to the identified state by interpolation processing.

In Step S240, the processor 120 of the lens apparatus reads an adjustment coefficient from the adjusting device 150, and transmits the adjustment coefficient to the processor 210 of the camera apparatus 200 via the communication device 130 of the lens apparatus 100 and the communication device 220 of the camera apparatus 200.

In Step S250, the processor 210 of the camera apparatus 200 obtains image data (video data) from the image pickup element 240. In Step S270, the processor 210 of the camera apparatus 200 corrects image data by a correction amount that is based on a correction coefficient obtained by multiplying the adjustment coefficient by the correction data. After that, the processing is returned to Step S220, and the processing is continued until a predetermined end condition is satisfied.

In the second embodiment, ON/OFF of transmission of correction data is switched by the switching device 160 of the lens apparatus 100. However, the configuration is not limited thereto. That is, the camera apparatus may include a switching device configured to switch between execution and non-execution of correction processing by the processor 210 of the camera 200, to thereby obtain a similar effect.

Third Embodiment

Figure 8:
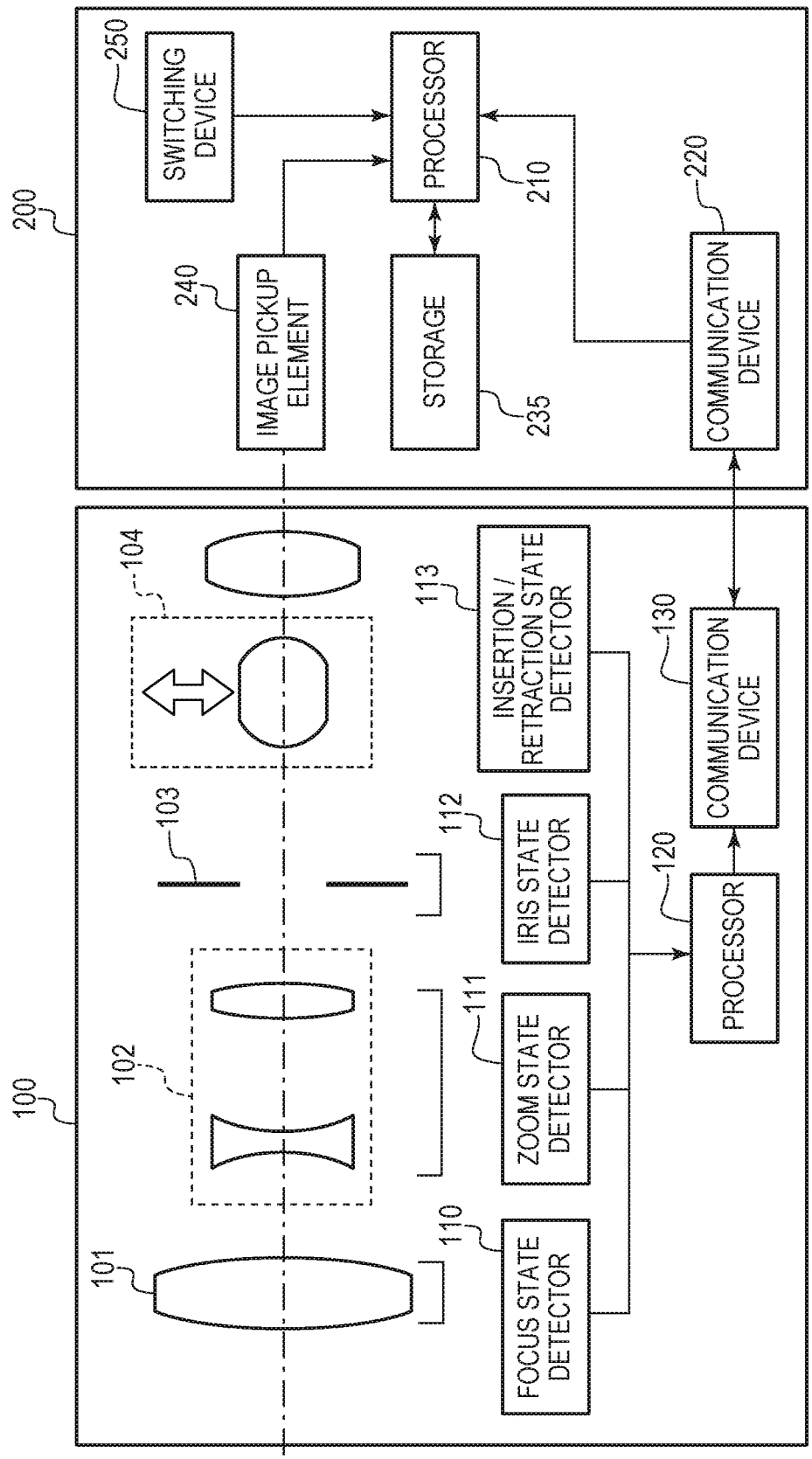
FIG. 8 is a diagram for illustrating a configuration example of an image pickup apparatus according to a third embodiment of the disclosure.

FIG. 8 is a diagram for illustrating a configuration example of an image pickup apparatus according to a third embodiment of the disclosure. A difference from the exemplary configuration of the first embodiment is that the image pickup apparatus includes one or more extender lens unit 104, which are selectively inserted or removed into/from the optical path, and are configured to shift the focal length range of the lens apparatus by the zoom lens unit in a stepwise manner. Further, another difference is that the image pickup apparatus includes the insertion/removal state detector 113 configured to detect the insertion or removal state of the extender lens unit. Further, another difference is that the lens apparatus 100 does not include the storage 140, and the camera apparatus 200 includes a storage 235 and a switching device 250 configured to switch ON/OFF of correction processing. The switching device 250 may not switch between ON/OFF of correction processing, but may switch ON/OFF of communication to/from the lens apparatus. Further, the exemplary configuration of the third embodiment is different from the exemplary configuration of the first embodiment in that the camera apparatus stores correction data, and in the third embodiment, the lens apparatus 100 and the camera apparatus 200 do not communicate correction data to/from each other. As a result, the communication load is reduced, and high-speed processing can be executed.

Figure 9:
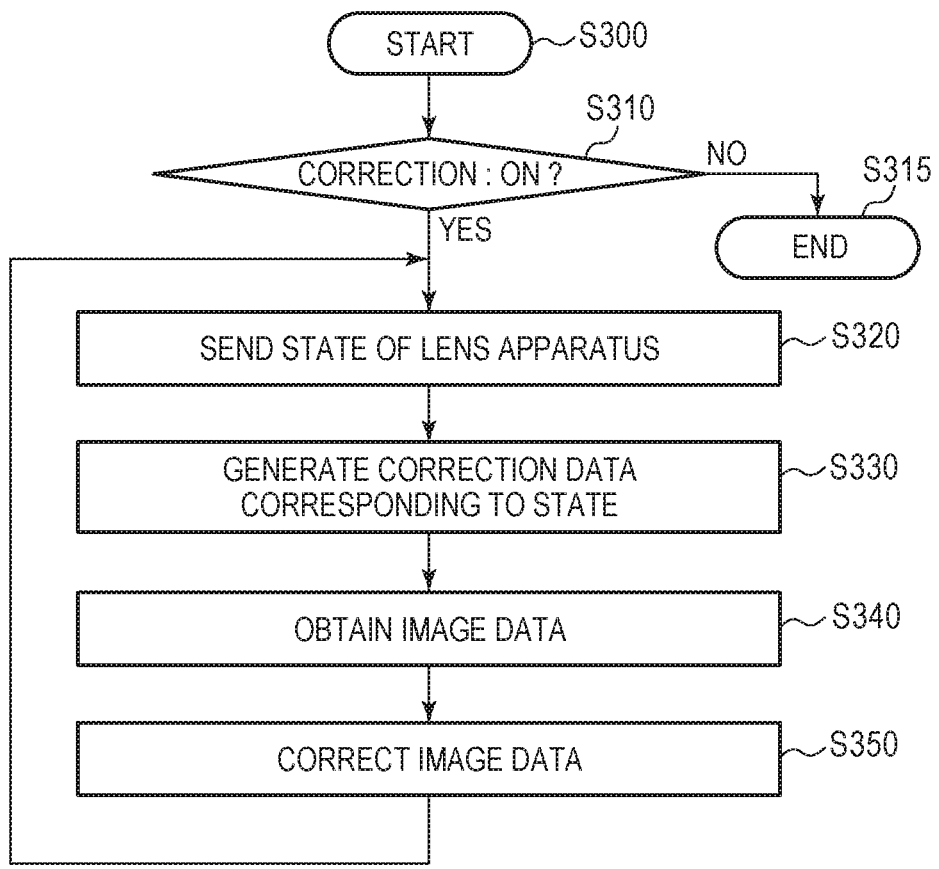
FIG. 9 is a diagram for illustrating an exemplary flow of processing in the third embodiment.

FIG. 9 is a flowchart for illustrating an exemplary flow of processing in the third embodiment. In Step S300, the processing is started. Next, in Step S310, the processor 210 of the camera apparatus 200 examines the state of the switching device 250, and when the state is ON for correction processing, the processing proceeds to Step S320. Further, when the state is OFF for correction processing, the processing proceeds to Step S315 and ends.

In Step S320, the processor 210 of the camera apparatus 200 receives respective states from the detectors 110, 111, 112, and 113 via the communication device 130 of the lens apparatus 100 and the communication device 220 of the camera apparatus 200. In Step S330, the processor 210 of the camera apparatus 200 reads correction data corresponding to the received states (states of lens apparatus) from the storage 235. The correction data stored in the storage 235 is discrete pieces of data relating to each of the states of the focus lens unit, the zoom lens unit, and the aperture stop. Thus, when the processor 210 of the camera apparatus 200 has identified each of the states of the focus lens unit, the zoom lens unit, the aperture stop, and the insertion/removal, the processor 210 generates correction data corresponding to the identified state of the lens apparatus by interpolation processing based on the read correction data. In Step S340, the processor 210 of the camera apparatus 200 obtains image data (video data) from the image pickup element 240. In Step S350, the processor 210 of the camera executes correction processing on image data. After that, the processing is returned to Step S320, and the processing is continued until a predetermined end condition is satisfied.

As described above, it is possible to correct the light amount at each image height by a small amount of data by performing correction based on the coefficient of each order of an n-th order expression with respect to the image height approximating correction data. Only the coefficient of a 0-th term (constant term) may be used for correction processing. For example, only the 0-th order correction data that depends on the state of the lens apparatus may be used for correction without depending on the image height in order to correct decrease in light amount due to an F-drop on the telephoto side. In that case, only the coefficient of the 0-th order term is transmitted from the lens apparatus to the camera apparatus as correction data, or may be stored in advance in the camera apparatus.

Further, in the above-mentioned configuration, the image data is corrected in the camera apparatus having an image processing function, but the configuration is not limited thereto. For example, an external apparatus (image processing apparatus) different from the camera apparatus and the lens apparatus may execute the correction processing based on image data from the camera apparatus and correction data from the lens apparatus.

Fourth Embodiment

Figure 10:
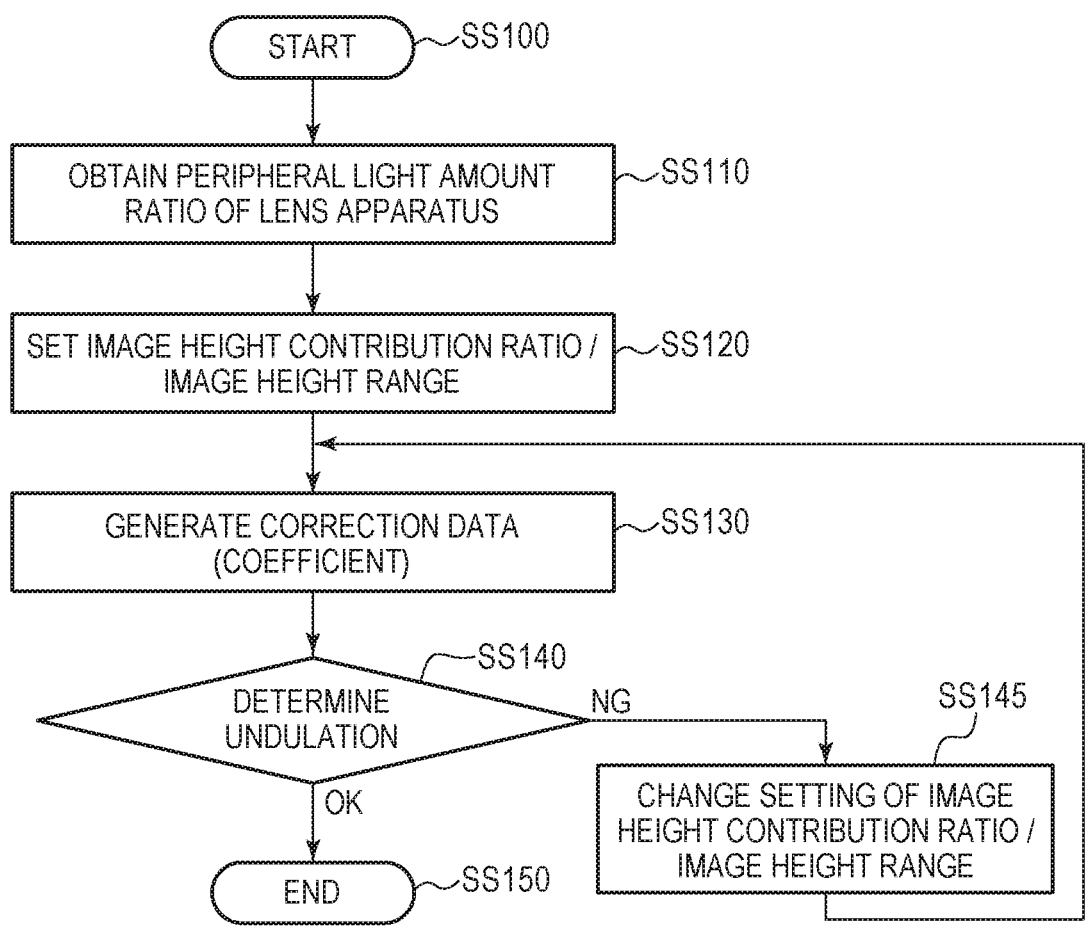
FIG. 10 is a diagram for illustrating an exemplary flow of a method of manufacturing according to a fourth embodiment of the disclosure.

Now, a method of generating correction data and a method of manufacturing for each type of apparatus are described. In such a case in which the relative illumination steeply changes depending on the image height in the image height range larger than a specific image height, in order to reduce a change in relative illumination after correction depending on the image height, correction data is generated by a method different from that for a case in which there is no steep change in relative illumination. In the following, this generation method is described. FIG. 10 is a diagram for illustrating an exemplary flow of a method of manufacturing according to a fourth embodiment of the disclosure. This flow is to reduce the undulation of the relative illumination after correction, which accompanies a change in image height, (to allow the undulation to fall within an allowable range) by reducing or eliminating contribution of the peripheral image height in the generation of correction data (production of each type of apparatus).

In FIG. 10, in Step SS100, the processing starts. In Step SS110, a relative illumination in a state of the lens apparatus (for example, the state of each of the zoom lens unit, the focus lens unit, the aperture stop, and the extender lens unit) is obtained. The relative illumination may be obtained based on design data or measurement of the lens apparatus. In Step SS120, at least one of an image height range or a contribution ratio of each image height to be used to generate correction data (condition for generating correction data) is set. For example, the entire image height range is set as the image height range, and the contribution ratio of each image height is set to 1. In this case, instead of setting the entire image height range, a part of the image heights, for example, the maximum image height, may be excluded from the image height range. Further, instead of setting the contribution ratio of each image height to 1, a contribution ratio of a part of the image heights, for example, the maximum image height, may be set to be less than 1.

In Step SS130, a coefficient (correction data) of an n-th order expression for approximating a correction amount is generated. The coefficient is generated by an optimizing method, for example, the least-squares method, with the correction amount or the relative illumination after correction being set as a target, for example. As another example, with the relative illumination before correction being set as a target, a polynomial may be generated by an optimizing method, for example, the least-squares method, and the coefficient may be generated based on the polynomial. In this case, for the purpose of facilitating the generation of the coefficient, for example, the contribution ratio of each image height or the correction amount (target value) at each image height may be appropriately changed within a minute range. In one embodiment, the order of the n-th order expression be four or less and the relative illumination after correction be highly uniform over the entire image height range.

In the next Step SS140, determination on undulation is performed. When the undulation due to a change in image height of the relative illumination after correction that is based on the correction data generated in the preceding step is within an allowable range, the processing proceeds to Step SS150, and the processing ends. When the undulation is not within the allowable range, the processing proceeds to Step SS145. In this case, a case in which the undulation is not within the allowable range may correspond to, for example, a case in which the relative illumination after correction increases and decreases, or decreases and increases, to be beyond the allowable range, along with the increase in image height. The case may also correspond to a case in which, in the relative illumination after correction, the difference between successive two extreme values is beyond an allowable range. The case may also correspond to a case in which Inequality (2) given above is not satisfied. The case may also correspond to a case in which an annular light amount distribution is exhibited in (simulation of) an image after correction. The case may also correspond to a case in which a phenomenon corresponding to any of the above-mentioned phenomena occurs in a correction amount that is based on the n-th order expression.

In Step SS145, at least one of the image height range or the contribution ratio of each image height to be used to generate the correction data is changed. In this case, the change may be, for example, at least one of exclusion of the maximum image height at the current time or reduction of the contribution ratio of the maximum image height. When both of the exclusion and the reduction are to be performed, for example, setting of the contribution ratio of the maximum image height to zero corresponds to exclusion of the maximum image height. After that, the processing returns to Step SS130 and the processing proceeds to Step SS150, or the processing is continued until a predetermined another end condition is satisfied.

Through the flow described above, appropriate correction can be performed to as large an image height as possible in accordance with a mode of the change in relative illumination (for example, how steep the change is) depending on the image height. Such processing is effective because an image is usually rectangular, and the maximum image height corresponds to each of four corners of the rectangle and thus the change in relative illumination is less likely to be conspicuous at the maximum image height.

Further, in Step SS145, instead of changing at least one of the image height range or the contribution ratio of each image height, a correction amount to be set as a target may be changed. In this case, the target correction amount may be changed such that a change thereof depending on the image height becomes smoother. For example, a portion in which the change in target correction amount is steep may be replaced with a portion in which the change in target correction amount is smooth through use of, for example, a known interpolation method. Note that, the method of generating correction data is not limited to the exemplary method described above. Therefore, the method of generating correction data is be able to generate such correction data as to allow, even when correction at the maximum image height and around the maximum image height is insufficient, correction at other image heights to be performed such that the undulation falls within the allowable range at the other image heights, for example.

The correction data generated in the manner described above is stored in a storage of a lens apparatus so that the lens apparatus that is beneficial in correction of a light amount of image data obtained by image pickup can be produced. Further, the correction data generated in the manner described above is stored in a storage of a processing apparatus (for example, a processing apparatus included in a camera apparatus) so that the processing apparatus (camera apparatus) that is beneficial in correction of a light amount of image data obtained by image pickup can be produced.

Fifth Embodiment

Figure 11:
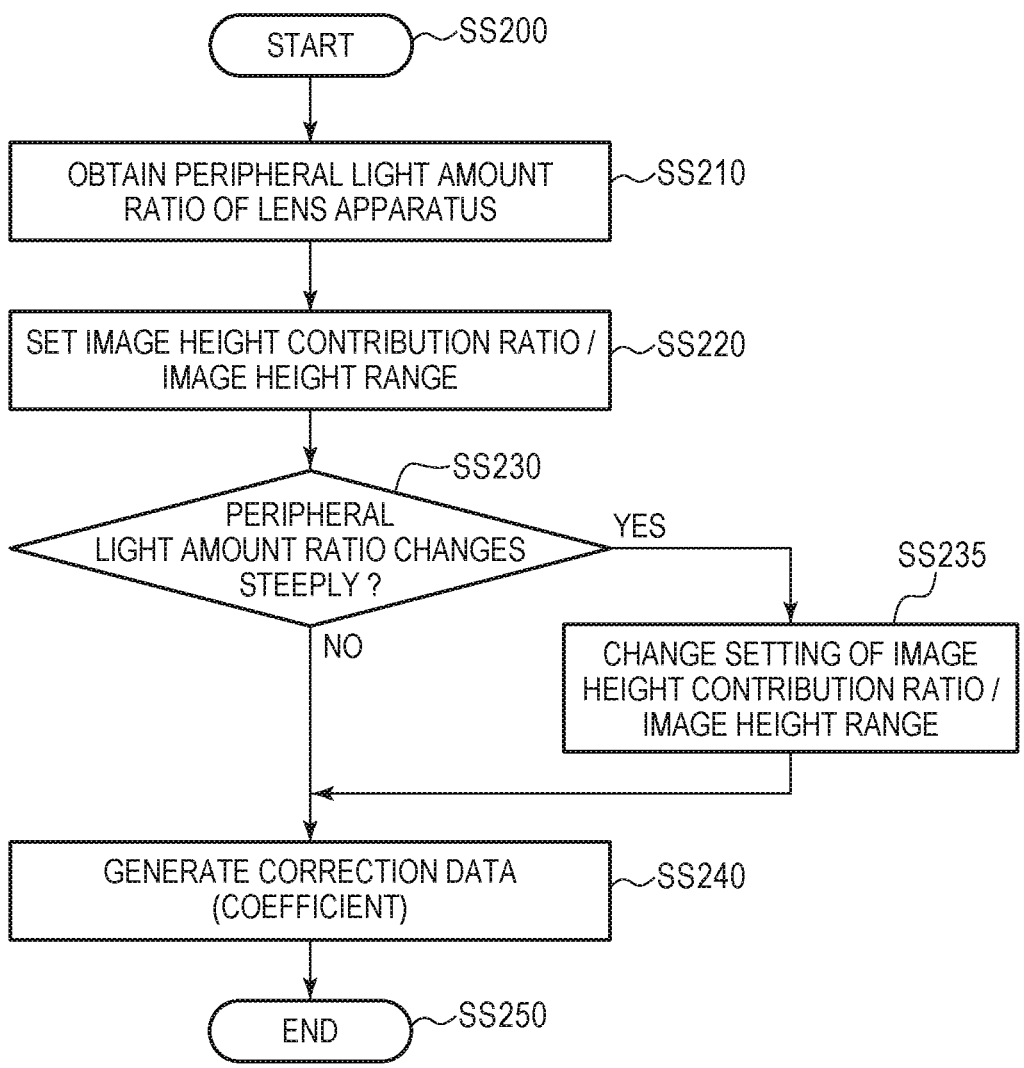
FIG. 11 is a diagram for illustrating an exemplary flow of a method of manufacturing according to a fifth embodiment of the disclosure.

FIG. 11 is a diagram for illustrating an exemplary flow of a method of manufacturing according to a fifth embodiment of the disclosure. In the flow described in the fourth embodiment, the condition for generating the correction data is repeatedly changed based on the determination on the undulation. In contrast, in the fifth embodiment, when the relative illumination before correction changes steeply, correction data is generated under a predetermined condition.

In FIG. 11, details of processing of Step SS200 to Step SS220 are the same as the details of processing of Step SS100 to Step SS120 in the fourth embodiment. In the next Step SS230, it is determined whether a change in relative illumination before correction depending on the image height is steep. When the change is steep, the processing proceeds to Step SS235. Meanwhile, when the change is not steep, the processing proceeds to Step SS240. When the change is steep, it is difficult for an n-th order expression being a low-order expression to accurately approximate a correction amount, and thus undulation occurs in the relative illumination after correction along with the change in image height. Thus, when the change is steep, a setting that is different from the setting made in SS220 is made. The determination on whether the change is steep may be made based on, for example, whether a change in inclination of the relative illumination relating to the image height (for example, a second derivative of the relative illumination relating to the image height) falls within an allowable range. The determination may also be made based on whether Inequality (6) is satisfied, or whether Inequalities (6) and (7) are satisfied. The determination may also be made based on whether a steep change in light amount ratio depending on the image height is exhibited in an image before correction or in simulation thereof.

In Step SS235, at least one of image height range or the contribution ratio of each image height to be used to generate the correction data is changed. In this case, this change may be, for example, at least one of exclusion of the maximum image height at the current time or reduction of the contribution ratio of the maximum image height. When both of the exclusion and the reduction are to be performed, for example, setting of the contribution ratio at the maximum image height to zero corresponds to exclusion of the maximum image height. For example, the contribution ratio of from an image height at which a steep change in relative illumination starts to the maximum image height may be reduced. Further, for example, the image height range may be limited to a range of from the image height of zero to an image height lower than the image height at which a steep change in relative illumination starts. Further, the contribution ratio in an image height range (for example, 80 percent to 100 percent image height) in which a steep change in relative illumination is less likely to be conspicuous may be uniformly reduced. In short, the change is a change such as to enable generation of the correction amount that places more emphasis on the range of from the center of the image to the intermediate image height.

Next, in Step SS240, a coefficient (correction data) of an n-th order expression for approximating a correction amount is generated. The coefficient is generated by an optimizing method, for example, the least-squares method, with the correction amount or the relative illumination after correction being set as a target, for example. As another example, with the relative illumination before correction being set as a target, a polynomial for approximating the relative illumination before correction may be generated by an optimizing method, for example, the least-squares method, or by solving simultaneous equations with respect to a light amount at a specific image height, for example, and the n-th order expression of the correction amount may be generated based on the polynomial. In this case, for the purpose of facilitating the generation of the coefficient, for example, the contribution ratio of each image height or the correction amount (target value) at each image height may be appropriately changed within a minute range. In one embodiment, the order of the n-th order expression be four or less and the relative illumination after correction be highly uniform over the entire image height range. In Step SS250, the processing ends.

Through the flow described above, appropriate correction can be performed to as large an image height as possible in accordance with a mode of the change in relative illumination (for example, how steep the change is) depending on the image height. Such processing is effective because an image is usually rectangular, and the maximum image height corresponds to each of four corners of the rectangle and thus the change in relative illumination is less likely to be conspicuous at the maximum image height.

Further, in Step SS235, instead of changing at least one of the image height range or the contribution ratio of each image height, a correction amount to be set as a target may be changed. In this case, the target correction amount may be changed such that a change thereof depending on the image height becomes smoother. For example, a portion in which the change in target correction amount is steep may be replaced with a portion in which the change in target correction amount is smooth through use of, for example, a known interpolation method. Note that, the method of generating correction data is not limited to the exemplary method described above. Therefore, the method of generating correction data is to be able to generate such correction data as to allow, even when correction at the maximum image height and around the maximum image height is insufficient, correction at other image heights to be performed such that the undulation falls within the allowable range at the other image heights, for example. Further, there is a benefit over the flow described in the fourth embodiment in terms of a period of time required to generate the correction data, because the repetitive processing is omitted.

The correction data generated in the manner described above is stored in a storage of a prepared lens apparatus so that the lens apparatus that is beneficial in correction of a light amount of image data obtained by image pickup can be produced. Further, the correction data generated in the manner described above is stored in a storage of a prepared processing apparatus (for example, a processing apparatus included in a prepared camera apparatus) so that the processing apparatus (camera apparatus) that is beneficial in correction of a light amount of image data obtained by image pickup can be produced.

The exemplary embodiments of the disclosure are described above, but it is to be understood that the disclosure is not limited to those embodiments and can be modified and changed variously within the scope of the gist thereof.

Numerical Embodiment

| Unit: mm | | | | | |
|---|---|---|---|---|---|
| Surface data | | | | | |
| Surface number | r | D | nd | vd | Effective diameter |
| 1 | 1,571.411 | 5.91 | 1.90366 | 31.3 | 212.83 |
| 2 | 361.491 | 3.13 | | | 205.43 |
| 3 | 389.831 | 20.85 | 1.43387 | 95.1 | 204.88 |
| 4 | −1,519.134 | 25.29 | | | 203.52 |
| 5 | 379.388 | 19.40 | 1.43387 | 95.1 | 198.91 |
| 6 | −1,690.060 | 0.25 | | | 198.64 |

-continued

| | | Unit: mm | | | |
|---|---|---|---|---|---|
| 7 | 270.376 | 20.46 | 1.43387 | 95.1 | 194.91 |
| 8 | 5,840.434 | 1.18 | | | 193.83 |
| 9 | 190.778 | 14.41 | 1.59240 | 68.3 | 182.16 |
| 10 | 365.545 | (Variable) | | | 180.35 |
| 11* | 11,015.733 | 2.20 | 2.00330 | 28.3 | 48.62 |
| 12 | 41.065 | 10.49 | | | 41.92 |
| 13 | −62.377 | 1.40 | 1.88300 | 40.8 | 41.20 |
| 14 | 65.176 | 9.88 | 1.95906 | 17.5 | 42.94 |
| 15 | −89.087 | 2.72 | | | 44.24 |
| 16 | −51.909 | 1.60 | 1.83400 | 37.2 | 44.38 |
| 17 | −103.320 | (Variable) | | | 46.56 |
| 18 | 115.185 | 11.58 | 1.59201 | 67.0 | 78.76 |
| 19* | −2,087.691 | 0.50 | | | 79.19 |
| 20 | 142.758 | 13.08 | 1.59201 | 67.0 | 80.37 |
| 21 | −231.655 | 0.20 | | | 79.98 |
| 22 | 122.793 | 2.50 | 1.80518 | 25.4 | 76.29 |
| 23 | 57.717 | 18.11 | 1.43387 | 95.1 | 71.81 |
| 24 | −564.234 | 0.50 | | | 70.72 |
| 25* | 364.246 | 6.50 | 1.49700 | 81.5 | 69.60 |
| 26 | −414.835 | (Variable) | | | 68.42 |
| 27 (Stop) | ∞ | 5.89 | | | 31.81 |
| 28 | −147.172 | 1.40 | 1.81600 | 46.6 | 32.30 |
| 29 | 46.924 | 1.05 | | | 31.20 |
| 30 | 37.303 | 4.69 | 1.80810 | 22.8 | 31.30 |
| 31 | 420.501 | 3.37 | | | 30.90 |
| 32 | −76.047 | 1.40 | 1.88300 | 40.8 | 30.60 |
| 33 | 191.170 | 11.30 | | | 30.40 |
| 34 | −41.223 | 1.78 | 1.65160 | 58.5 | 26.67 |
| 35 | 580.472 | 3.52 | 1.80518 | 25.4 | 27.78 |
| 36 | −156.414 | 6.46 | | | 28.43 |
| 37 | −103.332 | 5.71 | 1.70154 | 41.2 | 30.13 |
| 38 | −53.979 | 10.53 | | | 31.42 |
| 39 | −216.194 | 4.49 | 1.50137 | 56.4 | 32.25 |
| 40 | −43.973 | 0.74 | | | 32.44 |
| 41 | −72.585 | 1.30 | 1.88300 | 40.8 | 31.89 |
| 42 | 61.011 | 9.51 | 1.50137 | 56.4 | 32.28 |
| 43 | −35.679 | 0.20 | | | 33.06 |
| 44 | 96.272 | 8.69 | 1.49700 | 81.5 | 32.15 |
| 45 | −31.822 | 1.70 | 1.88300 | 40.8 | 31.45 |
| 46 | −176.143 | 2.14 | | | 31.79 |
| 47 | 50.459 | 8.14 | 1.48749 | 70.2 | 31.95 |
| 48 | −79.751 | 5.00 | | | 31.49 |
| 49 | ∞ | 33.00 | 1.60859 | 46.4 | 60.00 |
| 50 | ∞ | 13.20 | 1.51633 | 64.2 | 60.00 |
| 51 | ∞ | 18.00 | | | 60.00 |
| Image plane | ∞ | | | | |

Aspherical surface data

Eleventh surface

K = −2.61129e+006   A4 = 1.14924e−006   A6 = −4.20242e−010   A8 = 7.06050e−012
A10 = 1.71748e−014   A12 = −3.95143e−018   A14 = −2.50492e−020   A16 = 2.74832e−023
A3 = −7.41007e−007   A5 = −2.86209e−008   A7 = 4.68402e−011   A9 = −6.67517e−013
A11 = −2.87644e−016   A13 = 1.44174e−018   A15 = −1.26241e−021

Nineteenth surface

K = −8.09196e+003   A4 = 2.70610e−007   A6 = 1.07566e−009   A8 = −3.82716e−014
A10 = −1.89869e−016   A12 = 1.74435e−020   A14 = −2.31461e−023   A16 = 5.87253e−027
A3 = −1.02923e−007   A5 = −2.58308e−008   A7 = −1.15844e−011   A9 = 3.14187e−015
A11 = 2.64931e−018   A13 = 8.56747e−022   A15 = −2.81713e−025

Twenty-fifth surface

K = 6.92275e+001   A4 = −4.53959e−007   A6 = −6.59771e−011   A8 = −3.55842e−013
A10 = −1.48669e−016   A12 = 8.98957e−020   A14 = 6.50522e−022   A16 = 1.24233e−026
A3 = 7.06566e−007   A5 = −1.77804e−008   A7 = 3.13155e−011   A9 = 8.81552e−016
A11 = −1.46851e−017   A13 = 1.62371e−021   A15 = −1.37737e−023

Various data
Zoom ratio 69.98

| | Wide angle | Intermediate | Telephoto |
|---|---|---|---|
| Focal length | 8.60 | 348.30 | 601.79 |
| F-number | 1.80 | 1.80 | 3.11 |
| Half angle of view | 32.60 | 0.90 | 0.52 |
| Image height | 5.50 | 5.50 | 5.50 |

-continued

| Unit: mm | | | |
|---|---|---|---|
| Total lens length | 624.07 | 624.07 | 624.07 |
| BF | 52.17 | 52.17 | 52.17 |
| d10 | 3.03 | 178.44 | 184.56 |
| d17 | 279.71 | 41.05 | 15.69 |
| d26 | 3.00 | 66.25 | 85.49 |
| d33 | 11.30 | 11.30 | 11.30 |
| Entrance pupil position | 126.14 | 3,247.76 | 6,438.93 |
| Exit pupil position | 141.46 | 141.46 | 141.46 |
| Front principal point position | 135.34 | 4,578.71 | 9,974.12 |
| Rear principal point position | 9.40 | −330.30 | −583.79 |

Zoom lens unit data

| Unit | First surface | Focal length | Lens structure length | Front principal point position | Rear principal point position |
|---|---|---|---|---|---|
| 1 | 1 | 248.14 | 110.88 | 64.60 | −17.20 |
| 2 | 11 | −27.25 | 28.28 | 3.76 | −16.43 |
| 3 | 18 | 70.50 | 52.98 | 12.00 | −25.30 |
| 41 | 27 | −50.95 | 17.80 | 11.51 | −2.55 |
| 42 | 34 | −411.92 | 17.46 | −49.56 | −70.97 |
| 43 | 39 | 52.26 | 36.91 | 20.24 | −4.47 |
| 5 | 49 | ∞ | 46.20 | 14.58 | −14.58 |

Single lens data

| Lens | First surface | Focal length |
|---|---|---|
| 1 | 1 | −516.86 |
| 2 | 3 | 715.59 |
| 3 | 5 | 714.36 |
| 4 | 7 | 651.06 |
| 5 | 9 | 651.23 |
| 6 | 11 | −40.75 |
| 7 | 13 | −35.70 |
| 8 | 14 | 39.99 |
| 9 | 16 | −126.08 |
| 10 | 18 | 184.10 |
| 11 | 20 | 150.63 |
| 12 | 22 | −136.36 |
| 13 | 23 | 121.45 |
| 14 | 25 | 390.18 |
| 15 | 28 | −43.24 |
| 16 | 30 | 49.86 |
| 17 | 32 | −61.11 |
| 18 | 34 | −58.76 |
| 19 | 35 | 151.95 |
| 20 | 37 | 152.86 |
| 21 | 39 | 108.69 |
| 22 | 41 | −37.15 |
| 23 | 42 | 46.24 |
| 24 | 44 | 49.09 |
| 25 | 45 | −43.97 |
| 26 | 47 | 64.51 |
| 27 | 49 | 0.00 |
| 28 | 50 | 0.00 |

TABLE 1

Correction Data: Coefficient of Quartic Polynomial

| State of Lens Apparatus | | | Correction Coefficient | | | | |
|---|---|---|---|---|---|---|---|
| Aperture | Focus | Focal Length | $A_4$ | $A_3$ | $A_2$ | $A_1$ | $A_0$ |
| Open (F/1.80) | Focused on Infinity | Wide Angle End | −2.93.E−04 | 2.79.E−03 | −1.65.E−03 | 4.16.E−02 | 1.00.E−0+00 |
| Open (F/1.80) | Focused on Infinity | 348.30 mm | 1.13.E−03 | −7.53.E−03 | 4.78.E−02 | 5.70.E−02 | 1.00.E−0+00 |

TABLE 1-continued

Correction Data: Coefficient of Quartic Polynomial

| State of Lens Apparatus | | | Correction Coefficient | | | | |
|---|---|---|---|---|---|---|---|
| Aperture | Focus | Focal Length | $A_4$ | $A_3$ | $A_2$ | $A_1$ | $A_0$ |
| Open (F/3.11) | Focused on Infinity | Telephoto End | 2.79.E−03 | 8.60.E−03 | −7.58.E−02 | 9.62.E−02 | 3.02.E−0+00 |
| F/2.09 | Focused on Infinity | 348.30 mm | −3.61.E−03 | 3.35.E−02 | −5.96.E−02 | 2.29.E−02 | 1.00.E−0+00 |

TABLE 2

Conditional Expression (2): dD'(h)−dDlens(h)

| | Aperture | | | | | | | | | | |
|---|---|---|---|---|---|---|---|---|---|---|---|
| | Open (F/1.80) | | | Open (F/1.80) | | | Open (F/3.11) | | | F/2.09 | | |
| | Focus | | | | | | | | | | | |
| | Focused on Infinity | | | Focused on Infinity | | | Focused on Infinity | | | Focused on Infinity | | |
| | Focal Length | | | | | | | | | | | |
| | Wide Angle End | | | 348.30 mm | | | Telephoto End | | | 348.30 mm | | |
| Image Height h | dDlens (h) | dD' (h) | Conditional Expression (2) | dDlens (h) | dD' (h) | Conditional Expression (2) | dDlens (h) | dD' (h) | Conditional Expression (2) | dDlens (h) | dD' (h) | Conditional Expression (2) |
| 0 | 0.000 | 0.000 | 0.000 | 0.000 | 0.000 | 0.000 | 0.000 | 0.000 | 0.000 | 0.000 | 0.000 | 0.000 |
| 0.275 | −0.037 | −0.041 | −0.003 | −0.094 | −0.068 | 0.025 | −0.001 | −0.008 | −0.007 | 0.000 | −0.009 | −0.009 |
| 0.55 | −0.038 | −0.040 | −0.002 | −0.077 | −0.087 | −0.011 | −0.002 | −0.004 | −0.002 | 0.000 | 0.010 | 0.010 |
| 0.825 | −0.039 | −0.041 | −0.002 | −0.096 | −0.101 | −0.005 | −0.003 | −0.001 | 0.002 | 0.000 | 0.016 | 0.016 |
| 1.1 | −0.040 | −0.042 | −0.002 | −0.102 | −0.110 | −0.008 | −0.004 | 0.002 | 0.006 | −0.001 | 0.011 | 0.012 |
| 1.375 | −0.040 | −0.043 | −0.003 | −0.117 | −0.116 | 0.000 | −0.005 | 0.003 | 0.008 | −0.001 | −0.002 | −0.002 |
| 1.65 | −0.050 | −0.045 | 0.004 | −0.118 | −0.120 | −0.002 | −0.006 | 0.004 | 0.010 | 0.019 | −0.023 | −0.042 |
| 1.925 | −0.050 | −0.048 | 0.002 | −0.116 | −0.121 | −0.005 | −0.007 | 0.003 | 0.010 | −0.048 | −0.048 | 0.000 |
| 2.2 | −0.061 | −0.050 | 0.011 | −0.107 | −0.122 | −0.015 | −0.008 | 0.001 | 0.009 | −0.086 | −0.075 | 0.011 |
| 2.475 | −0.057 | −0.052 | 0.005 | −0.136 | −0.121 | 0.015 | −0.009 | −0.003 | 0.006 | −0.130 | −0.099 | 0.031 |
| 2.75 | −0.054 | −0.054 | 0.000 | −0.143 | −0.120 | 0.022 | −0.010 | −0.008 | 0.001 | −0.100 | −0.119 | −0.020 |
| 3.025 | −0.047 | −0.055 | −0.008 | −0.110 | −0.119 | −0.009 | 0.007 | −0.015 | −0.023 | −0.136 | −0.133 | 0.002 |
| 3.3 | −0.056 | −0.057 | −0.001 | −0.109 | −0.118 | −0.009 | −0.083 | −0.024 | 0.060 | −0.145 | −0.141 | 0.004 |
| 3.575 | −0.056 | −0.057 | −0.001 | −0.105 | −0.116 | −0.011 | −0.146 | −0.033 | 0.110 | −0.122 | −0.141 | −0.020 |
| 3.85 | −0.057 | −0.057 | 0.000 | −0.119 | −0.115 | 0.004 | −0.136 | −0.042 | 0.094 | −0.128 | −0.136 | −0.008 |
| 4.125 | −0.051 | −0.057 | −0.006 | −0.107 | −0.114 | −0.007 | −0.148 | −0.051 | 0.097 | −0.133 | −0.125 | 0.008 |
| 4.4 | −0.060 | −0.055 | 0.004 | −0.111 | −0.112 | −0.001 | −0.180 | −0.059 | 0.121 | −0.125 | −0.111 | 0.014 |
| 4.675 | −0.052 | −0.054 | −0.002 | −0.120 | −0.110 | 0.010 | −0.180 | −0.065 | 0.115 | −0.187 | −0.093 | 0.094 |
| 4.95 | −0.047 | −0.051 | −0.005 | −0.104 | −0.108 | −0.004 | −0.180 | −0.069 | 0.111 | −0.131 | −0.072 | 0.059 |
| 5.225 | −0.263 | −0.049 | 0.215 | −0.112 | −0105 | 0.006 | −0.160 | −0.071 | 0.089 | −0.129 | −0.047 | 0.082 |
| 5.5 | −0.769 | −0.045 | 0.724 | −0.110 | −0.103 | 0.007 | −0.171 | −0.070 | 0.101 | −0.127 | −0.018 | 0.109 |

TABLE 3

Conditional Expressions (3), (4), (15), (16), (17) and (18)

| Expression Number | Conditional Expression | Embodiment 1 |
|---|---|---|
| (3) | Ft/Fd | 1.73 |
| (4) | (Fd − Fw)/Log(fd/fw) | 0 |
| (15) | f1/fw | 28.85 |
| (16) | f1/f2 | −9.11 |
| (17) | $A_{0(ft)}/A_{0(fd)}$ | 3.02 |
| (18) | $(A_{0(fd)} - A_{0(fw)})$/Log(fd/fw) | 0 |

TABLE 4

| Conditional Expression (6): |dDlens_On-dDlens_nY| |||||||
|---|---|---|---|---|---|---|
| Aperture |||||||
| Open (F/1.80) |||| Open (F/1.80) |||
| Focus |||||||
| Focused on Infinity |||| Focused on Infinity |||
| Focal Length |||||||
| Wide Angle End |||| 348.30 mm |||
| hn | dDlens_On | dDlens_nY | Conditional Expression (6) | dDlens_On | dDlens_nY | Conditional Expression (6) |
|---|---|---|---|---|---|---|
| 0 | | −0.096 | | | −0.111 | |
| 0.275 | −0.037 | −0.099 | 0.062 | −0.094 | −0.112 | 0.018 |
| 0.55 | −0.038 | −0.103 | 0.065 | −0.085 | −0.113 | 0.028 |
| 0.825 | −0.038 | −0.106 | 0.068 | −0.089 | −0.114 | 0.026 |
| 1.1 | −0.039 | −0.111 | 0.072 | −0.092 | −0.115 | 0.023 |
| 1.375 | −0.039 | −0.115 | 0.076 | −0.097 | −0.115 | 0.018 |
| 1.65 | −0.041 | −0.120 | 0.079 | −0.101 | −0.115 | 0.014 |
| 1.925 | −0.042 | −0.125 | 0.083 | −0.103 | −0.115 | 0.012 |
| 2.2 | −0.044 | −0.131 | 0.086 | −0.103 | −0.115 | 0.012 |
| 2.475 | −0.046 | −0.137 | 0.092 | −0.107 | −0.114 | 0.007 |
| 2.75 | −0.047 | −0.146 | 0.099 | −0.111 | −0.111 | 0.000 |
| 3.025 | −0.047 | −0.157 | 0.110 | −0.111 | −0.111 | 0.000 |
| 3.3 | −0.047 | −0.169 | 0.122 | −0.110 | −0.111 | 0.001 |
| 3.575 | −0.048 | −0.186 | 0.137 | −0.110 | −0.122 | 0.002 |
| 3.85 | −0.049 | −0.207 | 0.158 | −0.111 | −0.111 | 0.000 |
| 4.125 | −0.049 | −0.238 | 0.189 | −0.110 | −0.111 | 0.001 |
| 4.4 | −0.050 | −0.283 | 0.233 | −0.110 | −0.111 | 0.001 |
| 4.675 | −0.050 | −0.360 | 0.310 | −0.111 | −0.108 | 0.003 |
| 4.95 | −0.050 | −0.516 | 0.467 | −0.111 | −0.111 | 0.000 |
| 5.225 | −0.061 | −0.769 | 0.708 | −0.111 | −0.110 | 0.001 |
| 5.5 | −0.096 | | | −0.111 | | |

| Aperture |||||||
|---|---|---|---|---|---|---|
| Open (F/3.11) |||| F/2.09 |||
| Focus |||||||
| Focused on Infinity |||| Focused on Infinity |||
| Focal Length |||||||
| Telephoto End |||| 348.30 mm |||
| hn | dDlens_On | dDlens_nY | Conditional Expression (6) | dDlens_On | dDlens_nY | Conditional Expression (6) |
|---|---|---|---|---|---|---|
| 0 | | −0.071 | | | −0.085 | |
| 0.275 | −0.001 | −0.075 | 0.074 | 0.000 | −0.090 | 0.090 |
| 0.55 | −0.001 | −0.079 | 0.078 | 0.000 | −0.095 | 0.095 |
| 0.825 | −0.002 | −0.084 | 0.082 | 0.000 | −0.100 | 0.100 |
| 1.1 | −0.003 | −0.089 | 0.086 | 0.000 | −0.107 | 0.106 |
| 1.375 | −0.003 | −0.094 | 0.091 | 0.000 | −0.114 | 0.113 |
| 1.65 | −0.004 | −0.101 | 0.097 | 0.003 | −0.123 | 0.126 |
| 1.925 | −0.004 | −0.108 | 0104 | −0.004 | −0.129 | 0.125 |
| 2.2 | −0.005 | −0.116 | 0.111 | −0.015 | −0.133 | 0.118 |
| 2.475 | −0.005 | −0.126 | 0.121 | −0.027 | −0.133 | 0.105 |
| 2.75 | −0.006 | −0.137 | 0.132 | −0.035 | −0.136 | 0.102 |
| 3.025 | −0.004 | −0.153 | 0.149 | −0.044 | −0.136 | 0.092 |
| 3.3 | −0.011 | −0.162 | 0.151 | −0.052 | −0.135 | 0.083 |
| 3.575 | −0.021 | −0.165 | 0.144 | −0.058 | −0.137 | 0.079 |
| 3.85 | −0.029 | −0.170 | 0.140 | −0.063 | −0.139 | 0.076 |
| 4.125 | −0.037 | −0.174 | 0.137 | −0.067 | −0.140 | 0.072 |
| 4.4 | −0.046 | −0.173 | 0.127 | −0.071 | −0.143 | 0.072 |
| 4.675 | −0.054 | −0.170 | 0.116 | −0.078 | −0.129 | 0.051 |
| 4.95 | −0.061 | −0.165 | 0.104 | −0.081 | −0.128 | 0.047 |
| 5.225 | −0.066 | −0.171 | 0.105 | −0.083 | −0.127 | 0.044 |
| 5.5 | −0.071 | | | −0.085 | | |

TABLE 5

| Conditional Expression (8): Ave_nY/Ave_On | | | | | |
|---|---|---|---|---|---|
| Aperture | | | | | |
| Open (F/1.80) | | | Open (F/1.80) | | |
| Focus | | | | | |
| Focused on Infinity | | | Focused on Infinity | | |
| Focal Length | | | | | |
| Wide Angle End | | | 348.30 mm | | |
| hn | Ave_On | Ave_nY | Conditional Expression (8) | Ave_On | Ave_nY | Conditional Expression (8) |
| 0 | 1.000 | 0.980 | 0.980 | 1.000 | 1.000 | 1.000 |
| 0.275 | 1.000 | 0.979 | 0.978 | 0.996 | 1.000 | 1.004 |
| 0.55 | 1.001 | 0.978 | 0.977 | 0.996 | 1.001 | 1.005 |
| 0.825 | 1.001 | 0.976 | 0.975 | 0.996 | 1.001 | 1.005 |
| 1.1 | 1.001 | 0.975 | 0.974 | 0.997 | 1.001 | 1.004 |
| 1.375 | 1.002 | 0.973 | 0.972 | 0.997 | 1.001 | 1.004 |
| 1.65 | 1.002 | 0.971 | 0.969 | 0.998 | 1.002 | 1.004 |
| 1.925 | 1.002 | 0.969 | 0.967 | 0.998 | 1.002 | 1.003 |
| 2.2 | 1.001 | 0.967 | 0.965 | 0.999 | 1.002 | 1.002 |
| 2.475 | 1.001 | 0.964 | 0.963 | 0.999 | 1.001 | 1.002 |
| 2.75 | 1.001 | 0.961 | 0.960 | 0.999 | 1.001 | 1.002 |
| 3.025 | 1.000 | 0.957 | 0.957 | 0.999 | 1.002 | 1.003 |
| 3.3 | 1.000 | 0.953 | 0.952 | 0.999 | 1.003 | 1.004 |
| 3.575 | 1.000 | 0.947 | 0.947 | 0.999 | 1.003 | 1.004 |
| 3.85 | 1.000 | 0.939 | 0.939 | 0.999 | 1.003 | 1.003 |
| 4.125 | 1.000 | 0.929 | 0.929 | 1.000 | 1.003 | 1.003 |
| 4.4 | 1.000 | 0.915 | 0.914 | 1.000 | 1.002 | 1.002 |
| 4.675 | 1.000 | 0.893 | 0.893 | 1.000 | 1.001 | 1.001 |
| 4.95 | 1.000 | 0.858 | 0.857 | 1.001 | 1.001 | 1.000 |
| 5.225 | 0.997 | 0.785 | 0.788 | 1.001 | 0.998 | 0.998 |
| 5.5 | 0.980 | 0.648 | 0.661 | 1.000 | 0.996 | 0.996 |

| Aperture | | | | | |
|---|---|---|---|---|---|
| Open (F/3.11) | | | F/2.09 | | |
| Focus | | | | | |
| Focused on Infinity | | | Focused on Infinity | | |
| Focal Length | | | | | |
| Telephoto End | | | 348.30 mm | | |
| hn | Ave_On | Ave_nY | Conditional Expression (8) | Ave_On | Ave_nY | Conditional Expression (8) |
| 0 | 3.018 | 3.028 | 1.003 | 1.000 | 0.981 | 0.981 |
| 0.275 | 3.028 | 3.028 | 1.000 | 1.001 | 0.980 | 0.979 |
| 0.55 | 3.034 | 3.028 | 0.998 | 1.001 | 0.979 | 0.978 |
| 0.825 | 3.037 | 3.027 | 0.997 | 0.999 | 0.978 | 0.979 |
| 1.1 | 3.037 | 3.026 | 0.996 | 0.998 | 0.977 | 0.979 |
| 1.375 | 3.035 | 3.025 | 0.996 | 0.997 | 0.976 | 0.979 |
| 1.65 | 3.032 | 3.025 | 0.998 | 0.998 | 0.975 | 0.977 |
| 1.925 | 3.028 | 3.026 | 0.999 | 0.999 | 0.973 | 0.974 |
| 2.2 | 3.023 | 3.028 | 1.002 | 0.999 | 0.971 | 0.971 |
| 2.475 | 3.020 | 3.031 | 1.004 | 0.998 | 0.968 | 0.970 |
| 2.75 | 3.018 | 3.035 | 1.006 | 0.998 | 0.966 | 0.967 |
| 3.025 | 3.020 | 3.039 | 1.006 | 0.998 | 0.963 | 0.694 |
| 3.3 | 3.021 | 3.038 | 1.005 | 0.998 | 0.959 | 0.961 |
| 3.575 | 3.020 | 3.038 | 1.006 | 0.998 | 0.954 | 0.956 |
| 3.85 | 3.018 | 3.044 | 1.009 | 0.999 | 0.947 | 0.949 |
| 4.125 | 3.016 | 3.053 | 1.012 | 0.999 | 0.938 | 0.939 |
| 4.4 | 3.014 | 3.065 | 1.017 | 0.999 | 0.925 | 0.926 |
| 4.675 | 3.014 | 3.084 | 1.023 | 0.996 | 0.907 | 0.910 |
| 4.95 | 3.015 | 3.110 | 1.031 | 0.993 | 0.890 | 0.896 |
| 5.225 | 3.020 | 3.145 | 1.041 | 0.998 | 0.870 | 0.880 |
| 5.5 | 3.028 | 3.179 | 1.050 | 0.981 | 0.845 | 0.862 |

TABLE 6

Conditional Expressions (10), (11) and (12)

| State of Lens Apparatus | | | Conditional Expression (10) | Conditional Expression (11) | Conditional Expression (12) |
|---|---|---|---|---|---|
| Aperture | Focus | Focal Length | $A_3 + 10 \times A_4$ | $|A_4|$ | $|A_3|$ |
| Open (F/1.80) | Focused on Infinity | Wide Angle End | −0.00014 | 0.00029 | 0.00279 |
| Open (F/1.80) | Focused on Infinity | 348.30 mm | 0.00380 | 0.00113 | 0.00753 |
| Open (F/3.11) | Focused on Infinity | Telephoto End | 0.03650 | 0.00279 | 0.00860 |
| F/2.09 | Focused on Infinity | 348.30 mm | −0.00261 | 0.00361 | 0.03352 |

TABLE 7

Conditional Expression (14): $|ddAve/A_0|$

| | Aperture | | | | | | | | | | | |
|---|---|---|---|---|---|---|---|---|---|---|---|---|
| | Open (F/1.80) | | | Open (F/1.80) | | | Open (F/3.11) | | | F/2.09 | | |
| | | | | | Focus | | | | | | | |
| | Focused on Infinity | | | Focused on Infinity | | | Focused on Infinity | | | Focused on Infinity | | |
| | | | | | Focal Length | | | | | | | |
| | Wide Angle End | | | 348.30 mm | | | Telephoto End | | | 348.30 mm | | |
| hn | dAve | ddAve | Conditional Expression (14) | dAve | ddAve | Conditional Expression (14) | dAve | ddAve | Conditional Expression (14) | dAve | ddAve | Conditional Expression (14) |
| 0 | 0.000 | 0.013 | 0.013 | 0.000 | −0.094 | −0.094 | 0.000 | 0.266 | 0.088 | 0.000 | 0.033 | 0.033 |
| 0.275 | 0.003 | −0.005 | −0.005 | −0.026 | 0.132 | 0.132 | 0.073 | −0.146 | −0.048 | 0.009 | −0.069 | −0.069 |
| 0.55 | 0.002 | −0.001 | −0.001 | 0.010 | −0.019 | −0.019 | 0.033 | −0.125 | −0.041 | −0.010 | −0.023 | −0.023 |
| 0.825 | 0.002 | 0.002 | 0.002 | 0.005 | 0.012 | 0.012 | −0.001 | −0.098 | −0.033 | −0.016 | 0.016 | 0.016 |
| 1.1 | 0.002 | 0.004 | 0.004 | 0.008 | −0.033 | −0.033 | −0.028 | −0.065 | −0.021 | −0.012 | 0.049 | 0.049 |
| 1.375 | 0.003 | −0.027 | −0.027 | −0.001 | 0.009 | 0.009 | −0.046 | −0.028 | −0.009 | 0.002 | 0.147 | 0.147 |
| 1.65 | −0.004 | 0.007 | 0.007 | 0.002 | 0.016 | 0.016 | −0.054 | 0.014 | 0.005 | 0.042 | −0.151 | −0.151 |
| 1.925 | −0.002 | −0.035 | −0.035 | 0.006 | 0.049 | 0.049 | −0.050 | 0.062 | 0.020 | 0.000 | −0.041 | −0.041 |
| 2.2 | −0.012 | 0.023 | 0.023 | 0.020 | −0.143 | −0.143 | −0.033 | 0.114 | 0.038 | −0.011 | −0.077 | −0.077 |
| 2.475 | −0.006 | 0.018 | 0.018 | −0.020 | −0.044 | −0.044 | −0.002 | 0.171 | 0.057 | −0.032 | 0.193 | 0.193 |
| 2.75 | −0.001 | 0.038 | 0.038 | −0.032 | 0.157 | 0.157 | 0.045 | 0.430 | 0.142 | 0.021 | −0.085 | −0.085 |
| 3.025 | 0.010 | −0.031 | −0.031 | 0.012 | 0.005 | 0.005 | 0.164 | −0.727 | −0.241 | −0.003 | −0.011 | −0.011 |
| 3.3 | 0.001 | −0.001 | −0.001 | 0.013 | 0.018 | 0.018 | −0.036 | −0.378 | −0.125 | −0.006 | 0.108 | 0.108 |
| 3.575 | 0.001 | −0.003 | −0.003 | 0.018 | −0.087 | −0.087 | −0.140 | 0.393 | 0.130 | 0.024 | −0.047 | −0.047 |
| 3.85 | 0.000 | 0.026 | 0.026 | −0.006 | 0.069 | 0.069 | −0.032 | 0.185 | 0.061 | 0.011 | −0.078 | −0.078 |
| 4.125 | 0.007 | −0.044 | −0.044 | 0.013 | −0.038 | −0.038 | 0.019 | −0.106 | −0.035 | −0.011 | −0.035 | −0.035 |
| 4.4 | −0.005 | 0.029 | 0.029 | 0.002 | −0.077 | −0.077 | −0.010 | 0.257 | 0.085 | −0.020 | −0.444 | −0.444 |
| 4.675 | 0.003 | 0.012 | 0.012 | −0.019 | 0.103 | 0.103 | 0.060 | 0.214 | 0.071 | −0.142 | 0.167 | 0.167 |
| 4.95 | 0.006 | −1.079 | −1.079 | 0.010 | −0.083 | −0.083 | 0.119 | 0.522 | 0.173 | −0.096 | −0.141 | −0.141 |
| 5.225 | −0.290 | −2.582 | −2.582 | −0.013 | −0.019 | −0.019 | 0.263 | −0.064 | −0.021 | −0.135 | −0.150 | −0.150 |
| 5.5 | −1.000 | | | −0.018 | | | 0.245 | | | −0.176 | | |

Other Embodiments

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™, a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2018-234728, filed Dec. 14, 2018, which is hereby incorporated by reference herein in its entirety.

What is claimed is:

1. A storage medium which stores correction data for obtaining a correction amount for correcting image data, obtained from an image formed by a lens apparatus, with respect to a distribution of a light amount in the image, wherein
the lens apparatus satisfies inequalities $1.10 < Ft/Fd < 4.00$; and $-0.01 < (Fd-Fw)/Log(Fd-Fw) < 1.20$, where Fw represents a minimum F-number at a wide angle end, Ft represents a minimum F-number at a telephoto end, fw represents a focal length at the wide angle end, ft represents a focal length at the telephoto end, and Fd represents a minimum F-number at a focal length fd expressed by an expression $fd=Fw/Ft \times ft$, the correction data includes a coefficient of an n-th order polynomial (where n is a non-negative integer) with respect to an image height h, the coefficient corresponding to a state of the lens apparatus,
the correction data satisfies in a range of the image height not lower than 0.1 times a maximum image height and not higher than 0.8 times the maximum image height, and does not satisfy in at least a part in a range of the image height higher than 0.8 times the maximum image height $-0.15 \leq dD'(h) - dDlens(h) \leq 1.98$, where dDlens(h) represents a gradient of the light amount at the image height h, and dD'(h) represents a gradient of an inverse of a value of the n-th order polynomial at the image height h.

2. A lens apparatus which satisfies inequalities $1.10 < Ft/Fd < 4.00$; and $-0.01 < (Fd-Fw)/Log(fd-fw) < 1.20$, where Fw represents a minimum F-number at a wide angle end, Ft represents a minimum F-number at a telephoto end, fw represents a focal length at the wide angle end, ft represents a focal length at the telephoto end, and Fd represents a minimum F-number at a focal length fd expressed by an expression $fd=Fw/Ft \times ft$, wherein the lens apparatus comprising the storage medium according to claim 1.

3. A storage medium which stores correction data for obtaining a correction amount for correcting image data, obtained from an image formed by a lens apparatus, with respect to a distribution of a light amount in the image, wherein
the lens apparatus satisfies inequalities $1.10 < Ft/Fd < 4.00$; and $-0.01 < (Fd-Fw)/Log(fd/fw) < 1.20$, where Fw represents a minimum F-number at a wide angle end, Ft represents a minimum F-number at a telephoto end, fw represents a focal length at the wide angle end, ft represents a focal length at the telephoto end, and Fd represents a minimum F-number at a focal length fd expressed by an expression $fd=Fw/Ft \times ft$, the correction data includes a coefficient of an n-th order polynomial (where n is a non-negative integer) with respect to an image height h, the coefficient corresponding to a state of the lens apparatus,
the correction data satisfies $-0.15 \leq dD'(h) - dDlens(h) \leq 1.98$, where dDlens(h) represents a gradient of the light amount at the image height h, and dD'(h) represents a gradient of an inverse of a value of the n-th order polynomial at the image height h, and
wherein the correction data satisfies in a state of the lens apparatus $Ave\_nY/Ave\_0n \leq 0.95$, and where Ave_0n represents an average of a product of a relative illumination of the image and the correction amount expressed by the n-th order polynomial at each image height from an image height zero to a first image height hn, and Ave_nY represents an average of a product of a relative illumination of the image and the correction amount expressed by the n-th order polynomial at each image height from the first image height hn to a maximum image height Y,
wherein the first image height hn satisfies $0.70 \times Y \leq hn < 1.00 \times Y$.

4. The storage medium according to claim 3, wherein the correction data is correction data in a state of the lens apparatus that satisfies an inequality $0.10 < |dDlens\_0n - dDlens\_nY|$, where dDlens_0n represents a gradient of a relative illumination of the image between an image height zero and a second image height hn, and dDlens_nY represents a gradient of a relative illumination of the image between the second image height hn and a maximum image height Y.

5. The storage medium according to claim 4, wherein the second image height hn satisfies an inequality $0.10 \times Y \leq hn \leq 0.80 \times Y$.

6. The storage medium according to claim 4, wherein the second image height hn satisfies an inequality $0.07 \times Y \leq hn < 1.00 \times Y$.

7. The storage medium according to claim 3, wherein the coefficient includes a coefficient $A_0$, a coefficient $A_1$, a coefficient $A_2$, a coefficient $A_3$, and a coefficient $A_4$ of a fourth order polynomial as the n-th order polynomial, the n-th order polynomial expressed by an expression $D = A_4 \times h^4 + A_3 \times h^3 + A_2 \times h^2 + A_1 \times h + A_0$, where D represents the correction amount.

8. The storage medium according to claim 7, wherein the coefficient $A_3$ and the coefficient $A_4$ satisfy an inequality $-0.10 < A_3 + 10 \times A_4 < 0.10$.

9. The storage medium according to claim 7, wherein the coefficient $A_3$ and the coefficient $A_4$ satisfy inequalities $|A_4| \leq 10.0020$; and $|A_3| \leq 0.0150$.

10. The storage medium according to claim 3, wherein an inequality $|ddAve/A_0| \leq 0.50$, is satisfied where ddAve represents a value of a second order derivative at an image height h of a product of a relative illumination of the image and the correction amount expressed by the n-th order polynomial at each image height h from an image height zero to a second image height hn, and $A_0$ represents a coefficient of a 0th-order term of the n-th order polynomial.

11. The storage medium according to claim 3,
wherein the lens apparatus includes a focus lens unit, an aperture stop, and a lens unit arranged on an image side of the aperture stop, and
wherein the focus lens unit, the aperture stop, and the lens unit arranged on the image side of the aperture stop are configured not to move for zooming.

12. The storage medium according to claim 3,
wherein the lens apparatus includes an aperture stop, and
wherein the lens apparatus satisfies, in a maximum aperture state of the aperture stop, inequalities $1.21 < A_{0(ft)}/A_{0(fd)} < 16.00$; and $-0.01 < (A_{0(fd)} - A_{0(fw)})/Log(fd/fw) < 0.50$ where $A_{0(fw)}$ represents a coefficient $A_0$ of a 0th-order term of the n-th order polynomial at the focal length fw, $A_{0(ft)}$ represents the coefficient $A_0$ at the focal length ft, and $A_{0(fd)}$ represents the coefficient $A_0$ at the focal length fd.

13. The storage medium according to claim 3, wherein the lens apparatus includes:
an extender lens unit configured to be inserted into and removed from an optical path; and
a detector configured to detect a state of insertion or removal of the extender lens unit.

14. A lens apparatus which satisfies inequalities $1.10 < Ft/Fd < 4.00$; and $-0.01 < (Fd-Fw)/Log(fd/fw) < 1.20$, where Fw represents a minimum F-number at a wide angle end, Ft represents a minimum F-number at a telephoto end, fw represents a focal length at the wide angle end, ft represents a focal length at the telephoto end, and Fd represents a minimum F-number at a focal length fd expressed by an expression $fd = Fw/Ft \times ft$, wherein the lens apparatus comprising the storage medium according to claim 3.

15. The lens apparatus according to claim 14, further comprising a user interface device to be used to adjust a coefficient of a term of the n-th order polynomial.

16. An image pickup apparatus comprising:
a lens apparatus according to claim 14, and
an image pickup element configured to receive an image formed by the lens apparatus.

17. A processing apparatus configured to correct image data, obtained from an image formed by a lens apparatus, with respect to a distribution of a light amount in the image, wherein
the processing apparatus is configured to correct the image data with the correction data stored in the storage medium of claim 3.

18. A camera apparatus comprising the processing apparatus of claim 17.

19. A method of manufacturing a lens apparatus, the method comprising:
preparing a lens apparatus including a storage medium;
generating the correction data to be stored in the storage medium of claim 3; and
storing the generated correction data in the storage medium included in the lens apparatus.

20. The method according to claim 19, wherein the generating includes changing, based on a change with an image height in one of a relative illumination before correction with the correction data and a relative illumination after the correction, one of a weight and a value of a target of the correction with respect to each image height, and generating the correction data based on one of the changed weight and the changed value.

21. A method of manufacturing a processing apparatus, the method comprising:
preparing a processing apparatus including a storage medium;
generating the correction data to be stored in the storage medium of claim 3; and
storing the generated correction data in the storage medium included in the processing apparatus configured to correct image data, obtained from an image formed by a lens apparatus, with respect to a distribution of a light amount in the image.

22. The method according to claim 21, wherein the generating includes changing, based on a change with an image height in one of a relative illumination before correction with the correction data and a relative illumination after the correction, one of a weight and a value of a target of the correction with respect to each image height, and generating the correction data based on one of the changed weight and the changed value.

* * * * *